US012762815B2

(12) United States Patent
Sipolins et al.

(10) Patent No.: US 12,762,815 B2
(45) Date of Patent: Oct. 13, 2026

(54) SYSTEMS AND METHODS FOR CONTROLLING A VIRTUAL REALITY ENVIRONMENT TO HELP PREVENT COLLISIONS IN THE REAL-WORLD

(71) Applicant: Adeia Guides Inc., San Jose, CA (US)

(72) Inventors: Aldis Sipolins, Somerville, MA (US); Dhananjay Lal, Englewood, CO (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 134 days.

(21) Appl. No.: 18/758,935

(22) Filed: Jun. 28, 2024

(65) Prior Publication Data

US 2026/0004535 A1 Jan. 1, 2026

(51) Int. Cl.
*G06T 19/20* (2011.01)
*G06T 13/40* (2011.01)
*G06T 19/00* (2011.01)

(52) U.S. Cl.
CPC .............. *G06T 19/20* (2013.01); *G06T 13/40* (2013.01); *G06T 19/006* (2013.01); *G06T 2210/21* (2013.01); *G06T 2219/2004* (2013.01); *G06T 2219/2016* (2013.01)

(58) Field of Classification Search
CPC ... G06T 19/006; G06T 19/20; G06T 2210/21; G06T 2219/2004; G06T 2209/2016
See application file for complete search history.

(56) References Cited

U.S. PATENT DOCUMENTS 9,851,792 B2 12/2017 Shanware
10,691,945 B2 6/2020 Bostick et al.
10,983,589 B2 4/2021 Lai et al.
12,437,489 B2 * 10/2025 Zhang ..................... G06T 7/593
2019/0035124 A1 * 1/2019 Kapinos .................. G06T 11/60
2025/0200904 A1 * 6/2025 Hong .................... G06T 19/006

OTHER PUBLICATIONS

Computer Vision, "3D Semantic Segmentation", available online at: <https://paperswithcode.com/task/3d-semantic-segmentation>, retrieved on Jul. 30, 2024, 3 pages.

Skarredghost, "Oculus Space Sense: how to activate it and hands-on it!", The Ghost Howls, available online at: <https://skarredghost.com/2021/11/05/oculus-space-sense-how-to-review/>, Nov. 5, 2021, 4 pages.

Sun, Q., et al., "Towards Virtual Reality Infinite Walking: Dynamic Saccadic Redirection", ACM Trans. Graph, vol. 37, No. 4, Article 67, Aug. 2018, 13 pages.

* cited by examiner

*Primary Examiner* — Antonio A Caschera
(74) *Attorney, Agent, or Firm* — HG LAW LLP

(57) ABSTRACT

A virtual reality (VR) environment is controlled to identify and address potential collisions with real-world objects while a user is interacting with the VR environment. A first virtual object at a first position is generated for display within a VR environment. A real-world object is detected near the VR device at a second position within the VR environment. An interaction score is determined for the first virtual object based at least in part on a potential interaction score with the real-world object. A risk score is determined for the first virtual object within the VR environment based at least in part on the real-world object. The first virtual object is modified based at least in part on the interaction score and the risk score. A second virtual object representing the real-world object is generated for display at the second position within the VR environment.

20 Claims, 12 Drawing Sheets

SYSTEMS AND METHODS FOR CONTROLLING A VIRTUAL REALITY ENVIRONMENT TO HELP PREVENT COLLISIONS IN THE REAL-WORLD

BACKGROUND

This disclosure is directed to systems and methods for controlling a virtual reality (VR) environment to identify and address potential collisions with real-world objects while a user is interacting with the VR environment. More particularly, the VR environment is created or controlled to help avoid placement of and/or interaction with virtual object(s) that would be likely to cause adverse collisions with real-world objects, and while promoting user immersion in the VR environment.

SUMMARY

As extended reality (XR) applications, such as those used on VR devices and/or augmented reality (AR) devices, strive for more immersive experiences, cyberphysical incidents and accidents will continue to be issues. More particularly, a technological problem that arises from the use of XR applications, especially VR applications, is accidental collision of real-world objects with users wearing XR devices, such as a head-mounted display (HMD). For example, when using VR equipment, VR users may be fully immersed in the virtual world simulated by the VR equipment and have a strong impression of interacting with the virtual environment. As a result, a VR user may have little to no awareness of the physical environment outside of the VR headset or VR environment and risk collisions with nearby objects or people, and which may cause injury or harm to themselves, others, nearby property, or the VR equipment. For example, a user wearing an HMD may reach out with their hand, which corresponds to a reaching out of a virtual representation of their hand to interact with a virtual object, e.g., a ringing virtual telephone, which is within the virtual environment of the HMD. While doing so, their hand may accidentally knock over a real-world cup of steaming hot coffee in the physical environment. Current VR applications may, but preferably would not, prompt a user to grab a virtual telephone or other object while a physical obstruction can be readily detected in the corresponding real-world area. Even if the real-world object is not as risky or hazardous as hot coffee, the accidental collision with real-world objects may make it difficult for the VR application to maintain an immersive virtual environment. There exists a need for better real-world object detection and performance safety within VR environments.

In one approach, systems may allow VR devices and/or AR devices (e.g., glasses, head-mounted devices or other wearable devices) to create a map of its surroundings based on sensor data captured by sensors on board the device. The device's sensors may collect visual data from the physical environment to be used as reference points. This approach may identify when a VR device is close to and at risk of colliding with a physical boundary and/or object (e.g., wall, furniture). In some approaches, an XR device may enable a user to manually define a safe area and warn them if they approach the edge of the defined area. However, these approaches can be overly restrictive to the configured static areas and may generally break the immersive experience of the VR application to prevent potential collisions (e.g., often with an overly sensitive alarm trigger). Moreover, such approaches also fail to address dangers of a VR application prompting interaction with, e.g., portable objects in virtual locations corresponding to a risk of interacting or colliding with dangerous real-world areas or objects.

In another approach, a VR device detects when another user enters the physical environment corresponding to the VR environment. Upon detecting that another user has entered the physical environment, the VR device may display an outline of the other user within the VR environment; however, not only does this break immersion, but the automatic detection and outline display only help prevent collisions with other people, not with objects. In another approach, a VR device may enable a passthrough mode to allow a user to see their physical surroundings. Passthrough allows users to see the real-world environment around them via cameras and sensors on the VR device. However, passthrough breaks the immersion of the VR environment and can be plagued with issues like a limited field of view, low resolution, and latency, which may trigger collisions.

In another approach, a VR device predicts collisions between VR users and objects based on the users' and objects' relative velocities (e.g., speeds and/or trajectories). For example, a VR device may predict, e.g., based on a VR user walking at a relatively constant velocity, that the VR user will likely collide with an item of furniture in the physical environment of the VR user. The VR device, based on the prediction, may provide a disruptive alarm to the VR user, warning them of the item of furniture in the physical environment; however, not only does this approach break VR immersion, but this approach does not help prevent collisions resulting from irregular movements (e.g., random, jerky, and/or furtive movements), particularly at short distances. For example, the VR device cannot predict a collision of a sudden movement such as an unexpected arm movement. This approach also does not consider the result of the real-world object collision and may warn the VR user even when a warning is not necessary. For example, the VR device may predict that the VR user's hand will collide with, e.g., a pencil on a desk. However, the effect of a collision with a pencil is low risk, thus it may not be worth breaking the immersion of the VR experience to inform the VR user of the pencil's location. Over-warning can also lead to harm, such as when a malfunctioning alarm is so disruptive that it is ignored or disabled completely and fails to prevent serious damage. There is a need for improved techniques for preventing collisions with real-world objects during a VR session.

To help address these problems, the systems, methods, and apparatuses disclosed herein may be configured generally to control a VR application or VR environment to help avoid virtual object placement and/or interactions that would be likely to cause collisions with real-world objects, and while promoting immersion in the VR environment. According to an embodiment, a system is configured to generate for display, within a VR environment via a VR device, a first virtual object at a first position. For example, the system generates a virtual phone sitting on a virtual desk within the virtual environment of an HMD. The disclosed techniques include detecting a real-world object near the VR device, the real-world object corresponding to a second position within the VR environment. For example, a real coffee cup sits on a real desk, which may correspond to a virtual desk or surface in the VR environment. The position of the real coffee cup corresponds to a second position within the VR environment. Some embodiments include determining an interaction score for the first virtual object within the VR environment based at least in part on a potential interaction with the real-world object at the second position. For example, the system may determine that the real coffee cup is full of coffee and therefore likely to be interacted with (e.g., the VR user will reach for the real coffee cup to drink the coffee). The system determines a high interaction score for the virtual phone because the virtual phone is near the real coffee cup. When the VR user interacts with the real coffee cup, the VR user is also likely to interact with the virtual phone due to its proximity to the real coffee cup.

In some embodiments, the system identifies an overlap space of at least a portion of or area around the first virtual object at the first position within the VR environment and at least a portion of or area around the second position within the VR environment corresponding with the real-world object. In some implementations, the interaction score is determined based at least in part on an amount of the overlap space, wherein a larger amount of overlap space corresponds to a higher interaction score. For example, the virtual phone at the first position within the VR environment may overlap partially with the real coffee cup at the second position within the VR environment. The overlap space may be the space where the virtual phone and the real coffee cup overlap. If the VR user reaches for the virtual phone while the virtual phone overlaps with the real coffee cup, the real coffee cup may accidentally be contacted and tip over. Additionally, if the VR user reaches for the real coffee cup while the real coffee cup overlaps with the virtual phone, the virtual phone may accidentally activate. A larger overlap space of the virtual phone and the real coffee cup leads to a higher chance of a collision with the unintended object.

In some embodiments, the system identifies a predicted interaction path (or potential collision path) between the first virtual object and the real-world object. The system may detect a third virtual object near the predicted interaction path. For example, between the virtual phone and the real coffee cup may be a virtual computer mouse. In some implementations, the system determines a probability of interaction of the third virtual object near the predicted interaction path. The interaction score of the first virtual object may be determined based at least in part on the probability of interaction of the third virtual object, wherein a higher probability corresponds to a higher interaction score. For example, the system may determine the interaction score of the virtual phone based at least in part on a probability of interaction with the virtual computer mouse. In some embodiments, the system updates the interaction score based at least in part on one or more of the following factors: time of day, contextual patterns, application type, recent activity, or historical patterns. For example, a real desk lamp near the virtual phone is more likely to be turned on as the sun goes down than early in the morning. Such aspects allow the system to determine the likelihood of interactions between the first virtual object and the VR user.

The disclosed techniques include determining a risk score for the first virtual object within the VR environment based at least in part on the real-world object. In some embodiments, the risk score of the first virtual object is determined based at least in part on an effect of the potential interaction with the real-world object. For example, a coffee cup full of coffee being knocked over has a more severe effect than an empty coffee cup being knocked over. The virtual phone may have a higher risk score when the real coffee cup is full than when the real coffee cup is empty. Based at least in part on the interaction score and the risk score, the disclosed techniques include modifying the VR environment, such as modifying the first virtual object. Such aspects allow the system to decrease the interaction score and/or risk score of the first virtual object, thereby helping to prevent particularly undesirable collisions with the real-world object.

In some embodiments, the system identifies, within the VR environment, a new position that does not overlap with another virtual object within the VR environment nor another real-world object near the VR device. For example, the system may identify a region on the virtual desk, e.g., on the other side of the virtual desk than the position of the virtual phone and the position corresponding to the real coffee cup, that does not have a virtual object or correspond to a real-world object. In some implementations, the system determines a second interaction score for the first virtual object at the new position within the VR environment based at least in part on a potential interaction with the real-world object. For example, the system may determine that the second interaction score is lower than the original interaction score of the virtual phone since the real coffee cup is less likely to be knocked over if the virtual phone is positioned on the other side of the virtual desk from the real coffee cup. Based at least in part on the second interaction score, the system may displace the first virtual object from the first position to the new position, such as via an animation, wherein the animation may correspond to a theme of the VR environment. For example, the system may move the virtual phone to the new position to decrease its interaction score. The system may move the virtual phone using animations and transitions such as dissolving, disappearing, rotating, fading, floating, any other suitable animation, or any combination thereof.

In some embodiments, when the first virtual object is non-interactable or has a low probability of interaction from the VR user, for instance, the system modifies the first virtual object within the VR environment by ceasing the generating for display the first virtual object. Such aspects decrease the likelihood of the VR user accidentally colliding with the real-world object due to the VR user reaching for the first virtual object. For example, by not generating for display the virtual phone, the system decreases the likelihood that the VR user will collide with the real coffee cup. In some embodiments, the system modifies the first virtual object within the VR environment by changing an appearance of the first virtual object by at least one of scaling the first virtual object, rotating the first virtual object, or repositioning the first virtual object. For example, the system, upon determining that the virtual phone is directly in front of the real coffee cup, may rotate and/or shrink the virtual phone so that it is next to the real coffee cup instead of directly in front of it. The rotation and/or shrinking of the virtual phone helps to prevent the VR user from colliding with the real coffee cup upon reaching for the virtual phone.

Disclosed techniques also include generating for display a second virtual object representing the real-world object at the second position within the VR environment. For example, the system may generate a virtual coffee cup in the position within the VR environment corresponding to the real coffee cup. In some embodiments, the second virtual object representing the real-world object at the second position within the VR environment comprises a visual deterrent. For example, the system may generate, e.g., a virtual cactus plant on a garden-themed virtual desk with many of the user's favorite plants, placing the virtual cactus at the position corresponding to the real coffee cup. The virtual cactus plant, e.g., among tulips, daisies, lilies, and other gentle-looking flowers, may act as a visual deterrent due to its spiky nature, thereby discouraging interaction with the position on the virtual desk corresponding to the real coffee cup and/or virtual cactus. An intensity of the visual deterrent may be based at least in part on at least one of the interaction score of the first virtual object or the risk score of the first virtual object. For example, upon determining that the real coffee cup has a high risk score (e.g., a 9 out of 10 when the real coffee cup is full of piping hot coffee), the system may generate for display an extremely spiky cactus. In another example, upon determining that the real coffee cup has a low risk score (e.g., a score of 40% when the real coffee cup is empty), the system may generate for display a tamer succulent, such as a jade plant, to deter interaction at a gentler level.

In some embodiments, based on scanning the real-world object, the system generates a three-dimensional (3D) representation of the real-world object, wherein the 3D representation (e.g., a 3D mesh representation) matches proportions of the real-world object. For example, the system may generate a 3D mesh of the real coffee cup that matches the size, shape, and orientation of the real coffee cup. The system may provide for display, via a diegetic placement or a saccadic masking, the 3D mesh at the second position within the VR environment. For example, the system may provide for display the 3D mesh of the coffee cup via saccadic masking, e.g., the system displays the 3D mesh during a fast eye movement of the VR user. In another example, the system may provide for display the 3D mesh of the coffee cup via diegetic placement, e.g., the system uses existing assets and mechanics of the VR environment to visualize a method by which the 3D mesh is placed. In some embodiments, the second virtual object representing the real-world object at the second position within the VR environment is visually customized to a theme of the VR environment. For example, the system may generate a virtual beer stein to represent the real coffee cup if the theme of the VR environment is, e.g., a Wild West saloon. The virtual beer stein may have similar proportions to the real coffee cup, thus effectively helping prevent collisions (and still promoting immersion).

In some embodiments, the VR environment comprises a room scale VR environment, a seated VR environment, or a standing VR environment. For example, a VR user in a seated VR environment may accidentally collide with real-world objects within reach, such as a real coffee cup. A VR user in a room-scale VR environment, however, may walk across the tracked space, enabling collisions with objects in a larger area, such as a real floor lamp. In some implementations, the system detects a second real-world object near the VR device. For example, the VR user may be holding a real water bottle. The system may determine a preferred position within the VR environment for the second real-world object and generate for display an indication of the preferred position within the VR environment. For example, the system may detect regions of the virtual desk and real desk that do not contain any virtual objects or real-world object and indicate this region to the VR user to place the real-world object. In some embodiments, the indication of the preferred position within the VR environment is generated for display via an AR device near the VR device. For example, if a nearby AR user is holding a real water bottle and wants to set it down on the real desk, the system may indicate to the AR user the preferred position so the AR user does not place the real water bottle near a virtual object, thereby preventing a potential collision between the VR user and the real water bottle.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
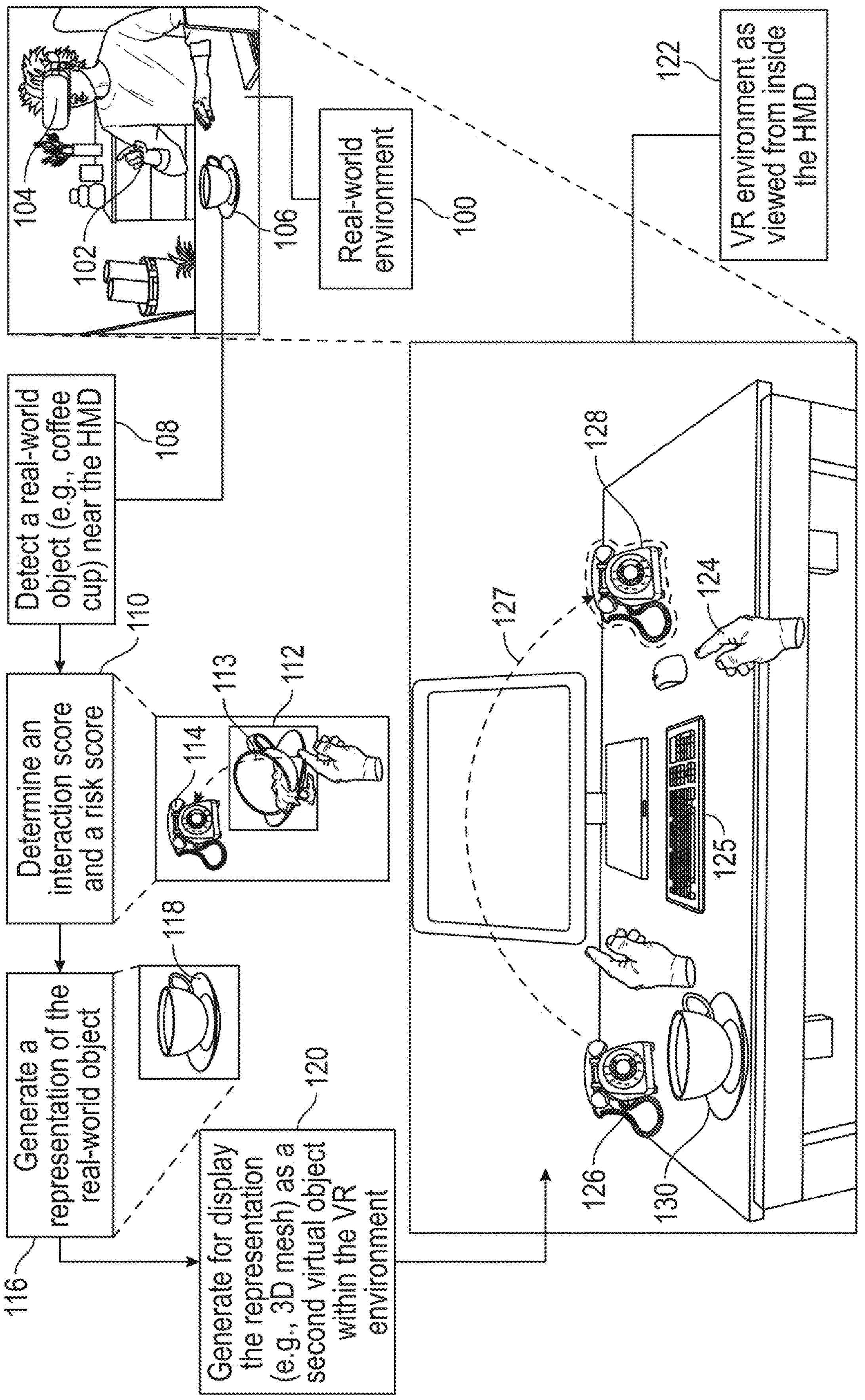
FIG. 1 depicts an illustrative example of modifying a virtual reality environment to help prevent a collision with a real-world object, in accordance with some embodiments of this disclosure.

FIG. 1 shows an illustrative example of modifying a virtual reality environment to help prevent a collision with a real-world object, in accordance with some embodiments of this disclosure. FIG. 1 illustrates a system configured to perform various functionalities described herein. In some embodiments, the system comprises or corresponds to an application that may be executed at least in part on a server (e.g., media content source 702 and/or one or more servers 704 of FIG. 7), a user equipment device (e.g., HMD 104 of FIG. 1, devices 706, 707, 708, and/or 710 of FIG. 7, such as, for example, a laptop computer, a personal computer, a desktop computer, a smart television, a smart watch or wearable device, smart glasses, a stereoscopic display, a wearable camera, XR glasses, XR goggles, an XR HMD, a near-eye display device, etc.), or any other suitable user equipment or computing device, or any combination thereof. The application and/or system may comprise or employ any suitable number of displays, sensors, or devices such as those described herein, or any other suitable software and/or hardware components, or any combination thereof.

In some embodiments, the system generates for display a VR environment (e.g., VR environment 122) via a VR device (e.g., HMD 104). In some implementations, the VR environment is generated for display by a third-party application, a third-party system, any other suitable VR provider, or any combination thereof. A VR user (e.g., VR user 102) may wear HMD 104 while sitting at a desk (e.g., in real-world environment 100). VR user 102 may, via HMD 104, see a VR environment (e.g., VR environment 122). HMD 104 may run a VR application, such as a virtual workplace. The VR environment may comprise a room scale VR environment, a seated VR environment, or a standing VR environment. Room-scale experiences may allow VR user 102 to walk naturally around VR environment 122, typically bounded by the dimensions a "safe area" encompasses, defined by VR user 102. In some implementations, VR user 102 predefines the safe area prior to engaging with VR environment 122.

Compared with room-scale VR environments, seated/standing VR generally uses a smaller safe area around VR user 102 that does not require or even allow moving around a room. Both approaches track head and hand/controller movement. Some VR experiences are "room-scale only," while some VR experiences are specifically designed for the user being seated/standing. Some embodiments may incorporate free movement in room-sized environments (or larger) or minimal movement in, e.g., limited and/or stationary environments (or a combination of each, switching modes automatically and/or manually).

In an example scenario of FIG. 1, VR environment 122 is a seated VR environment including a virtual desk, a virtual computer, a virtual keyboard, a virtual mouse, and virtual phone 114. VR user 102 may see their own hands (e.g., hands 124) while looking through HMD 104 at VR environment 122. In some embodiments, the system generates for display, within VR environment 122 via HMD 104, a first virtual object (e.g., virtual phone 114) at a first position (e.g., first position 126). For example, the system generates for display virtual phone 114 at the top left of the virtual desk within VR environment 122. At step 108, in some implementations, the system detects a real-world object (e.g., real coffee cup 106) at or near HMD 104. The system may detect the real-world object in many ways, such as localization of the object within an image captured by a camera of HMD 104, video object tracking, artificial intelligence (AI) image recognition, any suitable object detection technique or combination thereof. For example, the system uses AI image recognition to detect real coffee cup 106 near HMD 104. In some implementations, the location of the real-world object corresponds to a second position (e.g., second position 130) within the VR environment. For example, real coffee cup 106 is located in a "real" position that corresponds to the lower left portion of the virtual desk.

In some embodiments, at step 110, the system determines an interaction score and a risk score for the first virtual object (e.g., virtual phone 114). The system may determine the interaction score of the first virtual object within the VR environment based at least in part on a potential interaction (e.g., potential interaction 112) with the real-world object at the second position. In some embodiments, the system identifies an overlap space of at least a portion of or areas around virtual phone 114 at the first position within VR environment 122 and at least a portion of or area around real coffee cup 106 at a real-world position corresponding to the second position within VR environment 122. For example, the system may identify that the front of virtual phone 114 overlaps with a portion of the back of real coffee cup 106. While looking through HMD 104, user 102 is unaware of this overlap due to only seeing the virtual objects of VR environment 122. The system may determine the interaction score based at least in part on an amount of the overlap space, wherein a larger amount of overlap space corresponds to a higher interaction score (e.g., 75% overlap or a score of 7.5 on a scale of 0.0 to 10.0). For example, if virtual phone 114 is fully overlaying real coffee cup 106 within VR environment 122, the interaction score for virtual phone 114 would be very high (e.g., 90%) since there is a high likelihood of user 102 interacting with real coffee cup 106 while intending to reach for virtual phone 114. No matter what type or speed of movement the user might make to reach for the virtual phone 114, because of the determined overlap, the potential interaction (e.g., potential interaction 112) with real coffee cup 106 may result in an accident such as spilling the coffee.

In some embodiments, the system identifies a predicted or potential interaction path (e.g., predicted interaction path 113 between the virtual phone 114 and real coffee cup 106. For example, virtual phone 114 may be displayed in the left upper corner of the virtual desk of VR environment 122, and real coffee cup 106 may be in a position corresponding to the left lower corner of the virtual desk of VR environment 122. In some embodiments, the system identifies predicted interaction or collision path(s) between virtual and/or real-world objects, and may use a predicted interaction path to determine or adjust an interaction score associated with virtual objects. For example, the system may identify a predicted interaction path X between virtual phone 114 at position 126 and real coffee cup 106 at a position corresponding to the position of virtual coffee cup 130. The system may then determine an interaction score for virtual phone 114 based on the predicted interaction path X. In another example, the system may identify a predicted interaction path Y between virtual keyboard 125 and virtual phone 114 at position 126 and determine an interaction score for virtual phone 114 based on the predicted interaction path Y. In some embodiments, the system analyzes predicted interaction paths between interactable virtual objects and real-world objects in VR user 102's vicinity. In some implementations, interactable objects are objects that can be moved in VR and/or real-world environments, and/or are associated with at least one functionality when contacted or gestured toward by VR user 102.

In some embodiments, the system does not analyze predicted interaction paths between every virtual object and/or real-world object. In some embodiments, when predicted interactions paths intersect a portion of or an area around a real-world object (or the virtual representation of the real-world object at the respective position in the VR environment), the system determines an associated probability of interaction. The system may then use the associated probability of interaction to determine and/or update the interaction score. In some embodiments, the system determines a plurality of predicted interaction paths, between VR user 102 and virtual phone 114, each with varying areas around them. For example, predicted interaction path 113 may have an area around it indicating confidence in the path, where the dashed line of predicted interaction path 113 indicates the path that VR user 102 is most likely to follow. For example, the system may check if the predicted interaction path collides with any virtual objects. For example, if a user always reaches their hand the same way to pick up virtual phone 114, the predicted interaction path may be skinny and could just miss real coffee cup 106. If a user reaches their hand toward the virtual phone 114 slightly differently every time, the predicted interaction path may be wider and might now collide with real coffee cup 106. In some embodiments, the system identifies several distinct predicted interaction paths and uses current hand/controller position to identify which path is being taken.

In some implementations, the system detects a third virtual object near predicted interaction path 113. For example, between virtual phone 114 and real coffee cup 106 may be a virtual keyboard (e.g., virtual keyboard 125). If VR user 102 is typing on virtual keyboard 125, and virtual phone 114 rings, VR user 102 may move their left hand from virtual keyboard 125 to virtual phone 114, which defines a predicted interaction path. The system may determine a probability of interaction of the third virtual object within the predicted interaction path, wherein the interaction score is determined based at least in part on the probability of interaction of the third virtual object near the predicted interaction path, wherein a higher probability corresponds to a higher interaction score. For example, if VR user 102 is likely to move their body to transition between virtual keyboard 125 and virtual phone 114, the likelihood of collision with real coffee cup 106 increases because real coffee cup 106 is in the predicted interaction path between virtual phone 114 and virtual keyboard 125. The first and third virtual objects may be generally unrelated, however, the functionality of the VR application or environment (allowing VR user 102 to type on virtual keyboard 125 and then reach for virtual phone 114) creates some likelihood of an interaction path between the first and third virtual objects.

In some embodiments, the likelihood of the predicted interaction path is greater if the first and third virtual objects are more related. For example, the first virtual object may be a virtual charging station with a virtual smartphone docked there. The third virtual object may be a virtual mouse, which can also be docked at the virtual charging station for charging or just for storage and better organization of the space. Since a charging station and a mouse are more related than, e.g., a phone and a keyboard, the predicted interaction path may be associated with an increased likelihood. The system may determine the interaction score of virtual phone 114 based at least in part on a probability of interaction with the virtual keyboard. For example, the system determines that the virtual keyboard has a high probability of interaction from VR user 102 (e.g., 84%), thus the system determines a high interaction score for virtual phone 114 (e.g., 8 on a scale of 0 to 10) due to the virtual keyboard's high probability of interaction and proximity to virtual phone 114.

In some embodiments, the system updates the interaction score based at least in part on one or more of the following factors: time of day, contextual patterns, application type, recent activity, or historical patterns. For example, the system may determine that the frequency of user 102 reaching for real coffee cup 106 decreases as user 102 drinks from real coffee cup 106, thus the system may decrease the interaction score of virtual phone 114. In another example, a family portrait on a desk (e.g., 20% likelihood or frequency of interaction) is much less likely to be interacted with than a desk lamp with a manual switch (e.g., 70%). Furthermore, real-world objects may have different probabilities of interaction based on contextual factors such as time of day (e.g., VR user 102 is more likely to turn on a desk lamp as the sun goes down than in the morning, e.g., 75%), historical and contextual patterns (e.g., VR user 102 may tend to pick up a stress ball while on Zoom calls may boost a score by, e.g., 25%), recent activity (e.g., decreasing rate of VR user 102 interacting with real coffee cup 106 over time, e.g., lowering 5% every 20 minutes), and application type (e.g., VR user 102 is more likely to reach and put on headphones for Beat Saber, e.g., 88%, than VR Excel, e.g., 32%).

The system may determine the risk score of the first virtual object within the VR environment (e.g., VR environment 122) based at least in part on the real-world object. In some embodiments, the system determines the risk score of the first virtual object based at least in part on an effect of the potential interaction (e.g., potential interaction 112) with real coffee cup 106. The system may acquire and process data to analyze the risk score, e.g., by computer vision techniques for identifying real-world objects and determining characteristics of the real-world objects. The system may also acquire and process the data via user input of varying specificity (e.g., VR user 102 may request the system to advise them in avoiding hitting a, e.g., real-world object or a, e.g., upper portion of a tall mug with an open top filled with hot coffee) For example, the system may determine that hand 124 of VR user 102 colliding with real coffee cup 106 while it is full of hot coffee may result in hot coffee spilling on VR user 102 and/or elsewhere in real-world environment 100. This potential interaction could result in VR user 102 getting burned and/or real-world objects getting damaged or stained. Thus, the system determines that virtual phone 114 has a high risk score. In another example, the system may determine that hand 124 of VR user 102 colliding with real coffee cup 106 while it is empty may result only in real coffee cup 106 getting knocked over. The system determines that this potential interaction most likely will not have dangerous or particularly undesirable results (in an example, a break in immersion with the VR environment could also be considered an undesirable result), thus the system determines that virtual phone 114 has a low risk score. As VR user 102 interacts with real coffee cup 106, the system may determine that the risk score for virtual phone 114 changes as the state and the safety level or the predicted level of damage by collision changes over time. For example, the system may determine that as VR user 102 drinks the coffee from real coffee cup 106, the severity of the consequences of real coffee cup 106 getting knocked over decreases (e.g., less coffee results in less potential damage). Thus, the system determines that the risk score of virtual phone 114 decreases over time.

Based at least in part on the interaction score and the risk score, the system may modify virtual phone 114 within VR environment 122. In some embodiments, the system modifies virtual phone 114 within VR environment 122 by removing or otherwise no longer generating for display the virtual phone 114. Removing the virtual phone 114 reduces the potential for VR user 102 to reach toward virtual phone 114, and accidentally collide with real coffee cup 106 in the process. In some embodiments, the system modifies virtual phone 114 within VR environment 122 by changing an appearance of virtual phone 114, such as by scaling virtual phone 114 and/or rotating virtual phone 114. For example, the system may increase or decrease the size of virtual phone 114 to reduce the likelihood of VR user 102 colliding with real coffee cup 106 while reaching toward virtual phone 114. In some embodiment, the system modifies a spatial indicator (e.g., sound or haptic feedback) associated with virtual phone 114. For example, spatial sound and/or spatial haptic feedback may be modified so that VR user 102 perceives the ringing of virtual phone 114 to be located at a different location so as to deter VR user 102 from accidentally colliding with a nearby real-world object.

In some embodiments, the interaction score of virtual phone 114 at the first position in the VR environment is a first interaction score. The system may identify, within VR environment 122, a new position that does not overlap with another virtual object within VR environment 122, nor another real-world object near HMD 104. For example, the system may determine that, within VR environment 122, a virtual object is not generated for display at a position corresponding to the upper right portion of the virtual desk (e.g., position 128), and that there is also not a real-world object in the real-world position corresponding to the upper right portion of the virtual desk. In some implementations, the system determines a second interaction score for virtual phone 114 within VR environment 122 based at least in part on a potential interaction with real coffee cup 106 at position 128. For example, the system determines that the interaction score for virtual phone 114 at position 128 is lower than at the first position (e.g., first position 126) since virtual phone 114 is farther away from real coffee cup 106 at the position 128, which decreases or results in no overlap space with real coffee cup 106, and/or decreases the likelihood of or results in no overlap or intersection between predicted interaction path(s) and the real coffee cup. Based at least in part on the second interaction score being less than the first interaction score by a threshold amount, the system may displace virtual phone 114 from the first position to the new position via an animation. The use of a threshold difference between the first and second interaction scores may be useful to avoid moving the virtual phone if there is only a slightly less likelihood of causing a collision, and thereby to help avoid breaking immersion. For example, the system may glide virtual phone 114 from first position 126 to second position 128, as indicated by arrow 127. In another example, the system may place the virtual phone at the second position 128 prior to or concurrently with organizing the rest of the virtual objects within VR environment 122. For example, the system may initially place virtual phone 114 at position 128 to avoid impacting immersion with an animation.

In some embodiments, the system scans real coffee cup 106. For example, the system may use 3D scanning software to scan real coffee cup 106 using a camera of HMD 104. At step 116, based on the scanning the real-world object, the system may generate 3D representation 118 (e.g., a 3D mesh) representing real coffee cup 106, wherein 3D representation 118 matches proportions of real coffee cup 106. For example, the system generates a 3D representation of real coffee cup 106 with at least the approximate size of the real coffee cup 106. The system may determine whether the real-world object fits or is consistent with the VR environment; if not, selecting and displaying a virtual object that is consistent with the VR environment and that is about the same size as the 3D representation.

The system may generate 3D representation 118 via computer-aided design (CAD), generative AI, any other suitable 3D mesh generation technique, or any combination thereof. In some implementations, the system generates a 3D mesh of real coffee cup 106 that matches the size, shape, and orientation of real coffee cup 106. The system may use AI to generate the 3D representation. In some embodiments, the system generates for display a second virtual object representing real coffee cup 106 at the second position within VR environment 122 (e.g., the position on the virtual desk corresponding to the real position of real coffee cup 106). For instance, the system may, at step 120, generate for display 3D representation 118 as a second virtual object (e.g., virtual coffee cup 130) within VR environment 122. The system may use AI to generate the second virtual object (e.g., virtual coffee cup 130).

In some embodiments, the second virtual object representing the real-world object at the second position within the VR environment comprises a visual deterrent. For example, rather than generating for display virtual coffee cup 130 in the position within VR environment 122 corresponding to the position of real coffee cup 106, the system may generate for display a virtual spiky cactus in the position within VR environment 122 corresponding to the position of real coffee cup 106. The system may generate the virtual spiky cactus to further discourage VR user 102 from following a predicted hand movement path to avoid a potential collision with real coffee cup 106. Rather than generate a persistent dangerous virtual object, the system may trigger visual deterrent generation upon detecting VR user 102's hand movement towards real coffee cup 106 (e.g., a snarling rat jumps onto the table or a panel on the desk opens and flames shoot out). The power of immersion in VR may trigger the same reflexive actions as real-world dangers, making virtual deterrents effective at preventing collisions with real-world objects. In some implementations, the system visually customizes the second virtual object/and or visual deterrent representing the real-world object at the second position within VR environment 102 to a theme of VR environment 102. For example, the system may generate a virtual tumbleweed as a visual deterrent in a Wild West-themed VR environment, or virtual spiky coral in an aquatic-themed VR environment. In another example, the system would not generate for display a virtual coffee cup as a second virtual object in a garden-themed VR environment since a coffee cup would out of place. Instead, the system may generate a virtual object that is more consistent with the VR environment theme. For example, the system may generate for display a virtual spiky cactus on a virtual potting bench as opposed to generating for display a virtual coffee cup on a virtual desk.

In some implementations, an intensity of the visual deterrent is based at least in part on at least one of the interaction score of the first virtual object or the risk score of the first virtual object. The system may also base the intensity of the visual deterrent at least in part on the size, type, or danger level of the real-world object. For example, spilling a soda bottle with the cap closed would cause far less damage in the real-world than spilling the same bottle with the cap taken off. Similarly, a freshly opened soda bottle would have the potential of causing more damage than an almost empty one. The virtual deterrent may indicate potential damage in multiple ways (e.g., lightly smoking vs. white-hot, a pocket knife vs. a hypodermic needle). Highly dangerous objects may be placed in regions with higher likelihood of collision. For example, the system may generate a virtual spikey cactus on fire in a region that is often trafficked by the VR user, e.g., over a virtual keyboard, if the region has, e.g., real coffee cup 106 placed in it. In another example, the system may generate for display a jade plant when real coffee cup 106 is empty and a spiky cactus when real coffee cup 106 is full of hot coffee.

As VR user 102 interacts with real coffee cup 106, the risk score may change over time. For example, as VR user 102 drinks coffee from real coffee cup 106, the system may change the rendering, or mapping, of a virtual object that represents the real coffee cup 106 to indicate a decreased risk score (e.g., a jet of flame versus a lit candle).

In some implementations, the system provides for display, via a diegetic placement or a saccadic masking, 3D representation 118 at the second position within VR environment 102. The system may place 3D representation 118 and/or the second virtual object via simple placement, diegetic placement, saccadic masking, any other suitable virtual object placement technique, or any combination thereof. For example, simple placement provides for display the second virtual object suddenly, e.g., the system displays virtual coffee cup 130 within VR environment 102 seemingly out of nowhere. Simple placement may detract from immersion. Diegetic placement uses, e.g., existing assets and mechanics of the VR experience to visualize a method by which the 3D mesh and/or the second virtual object is placed (e.g., for a space-themed VR application, a virtual rocket ship may crash into the virtual desk, leaving virtual coffee cup 130 in a virtual crater). Saccadic masking relies on, e.g., eye tracking to place virtual objects during saccades (i.e., fast eye movements). Humans are essentially blind to visual changes during saccades, so such generation would go unnoticed. From the VR user 102's perspective, there would be no coffee cup on the desk, they would look at something else, and when they look back the real coffee cup would be there.

Figure 2:
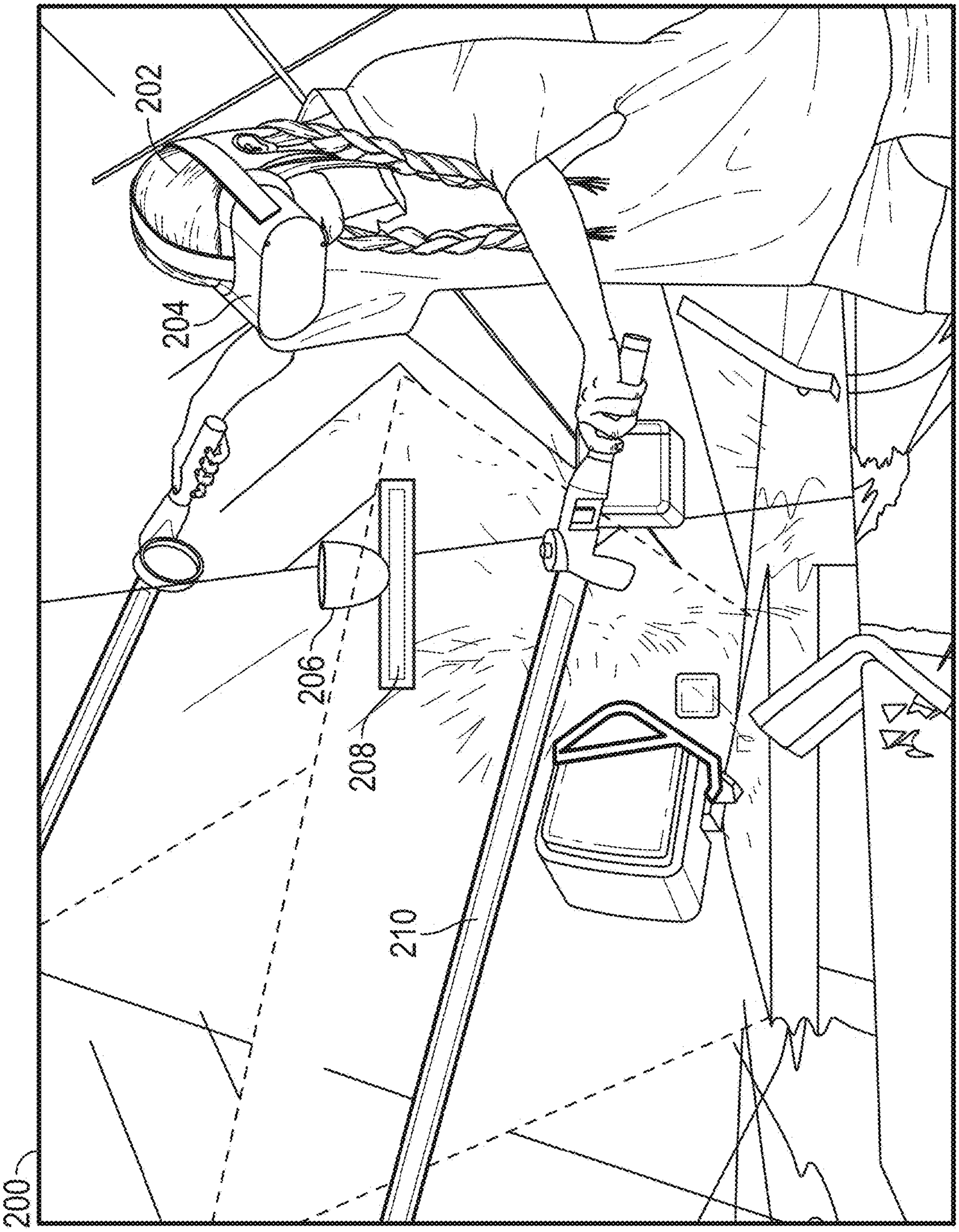
FIG. 2 depicts an illustrative example of modifying a virtual reality environment to help prevent a collision with a real-world object, in accordance with some embodiments of this disclosure.

FIG. 2 shows an illustrative example of modifying a virtual reality environment to prevent a collision with a real-world object, in accordance with some embodiments of this disclosure. In some embodiments, a system (e.g., the system as described in connection with FIG. 1) generates for display a VR environment (e.g., VR environment 200) via a VR device (e.g., HMD 204). In some implementations, the VR environment is generated for display by a third-party application, a third-party system, any other suitable VR provider, or any combination thereof. A VR user (e.g., VR user 202) may wear HMD 204 to see VR environment 200. HMD 204 may run a VR application such as a virtual workplace or a VR game. VR environment 200 may comprise a room scale VR environment, a seated VR environment, or a standing VR environment. For example, the system runs a game application via HMD 204 in a standing VR environment (e.g., VR environment 200).

In some embodiments, the system detects a real-world object (e.g., real coffee cup 206) near HMD 204. In some implementations, real coffee cup 206 is placed near HMD 204 while the system is generating for display VR environment 200 to VR user 202 via HMD 204. For example, a real-world person may walk by HMD 204, as it is being used by VR user 202, and set down real coffee cup 206 on a nearby kitchen counter. The system may detect the real-world object in various ways, such as localization of the object's image within an image captured by a camera of HMD 204, video object tracking, artificial intelligence (AI) image recognition, any suitable object detection technique or combination thereof. For example, the system uses AI image recognition to detect real coffee cup 206 near HMD 204. In some implementations, the real-world object corresponds to a position within the VR environment. For example, the real coffee cup is located at a "virtual" position that corresponds to, e.g., a kitchen counter next to VR user 202. In some implementations, the system determines that a first virtual object is located at a position within VR environment 200 near the position of the real-world object. For example, the system determines that a virtual light saber (e.g., virtual light saber 210), visible to VR user 202 via HMD 204, within VR environment 200 is near the real coffee cup.

In some implementations, the system determines an interaction score and a risk score for the first virtual object (e.g., the virtual light saber), as described above in connection with FIG. 1. For example, the system determines an interaction score of the virtual light saber based on, e.g., the proximity of the virtual light saber to a position in the VR environment that corresponds with the real coffee cup, and a risk score of the virtual light saber based on, e.g., how much coffee would spill if the real coffee cup were knocked over from the kitchen counter. As described above in connection with FIG. 1, the system may generate for display a virtual object, e.g., virtual coffee cup 206, which represents the real coffee cup. For example, if the system determines that a virtual coffee cup may be out of place within a, e.g., medieval-themed VR environment, the system may replace the virtual coffee cup with a virtual face of a sword trainer that is observing the user to help maintain immersion in the VR environment.

The system may determine that VR environment 200 does not include a virtual surface on which to place the virtual object representation of the real object, or the system may determine the difference between virtual surface height and a real surface height exceeds a threshold. In some embodiments, based on the interaction score, the risk score, and/or the presence of or difference between virtual and real surface heights exceeding a threshold, the system modifies VR environment 200 by generating for display virtual platform 208, on which to place the virtual object. For example, the system generates for display virtual platform 208 at a position within VR environment 200 corresponding to a position right beneath the position of real coffee cup 206 (e.g., at the height of the kitchen counter). In some embodiments, the system may modify a preexisting virtual surface to resemble the real surface. For example, the system may adjust a virtual ledge to resemble the real kitchen counter on which the real coffee cup is placed. In some implementations, the system may use relevant assets from VR environment 200 and/or the theme of VR environment 200 to maintain consistency with VR environment 200 (e.g., a virtual wooden table for a Wild West VR game or a virtual floating platform for an outer space VR game).

In some embodiments, if the difference in size and/or shape of a preexisting virtual surface and a real surface exceeds a threshold, the VR device may extend the virtual surface within the bounds of the real surface to create a viable location for a real object. For example, the system may adjust a virtual ledge by increasing its length in order to fit virtual coffee cup 206 on it. The system may determine the location of the surface extension based on VR user's optimal interaction distance, handedness, and/or the presence of virtual objects. The system may determine the size of the surface extension based on the size of the real coffee cup and/or the presence of other virtual objects within virtual environment 200. In some embodiments, if VR user 202 enters passthrough mode to reach for a real object (e.g., the real coffee cup), the system may identify interactable virtual objects in the predicted path the VR user 202's hand will take to reach the real object. In some embodiments, a passthrough mode may include generating transparent and/or translucent images of real and/or virtual objects based on, e.g., interaction scores, risk scores, any other safety/danger information, or any combination thereof.

Figure 3:
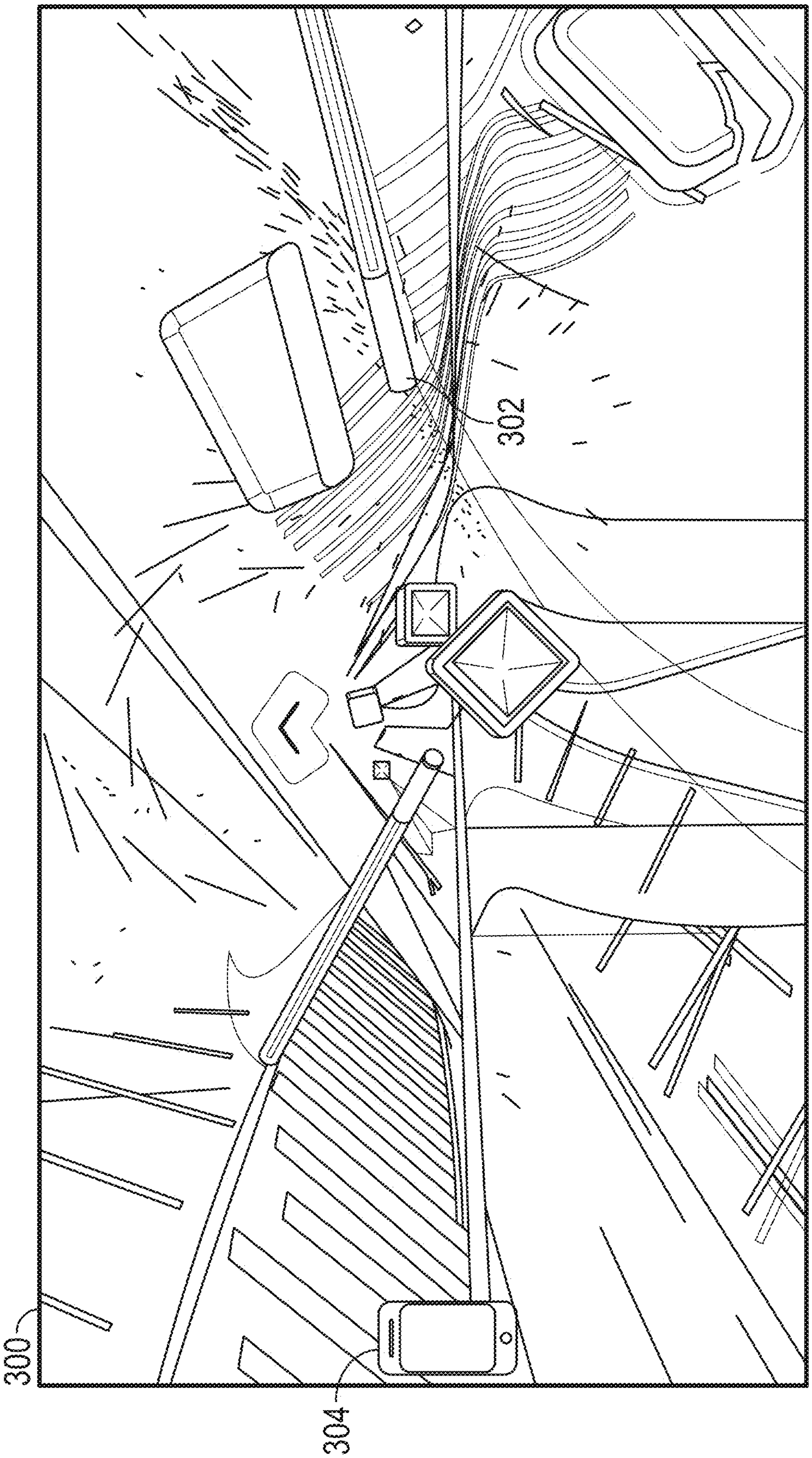
FIG. 3 depicts an illustrative example of tracking a real-world object with respect to a virtual reality environment, in accordance with some embodiments of this disclosure.

FIG. 3 shows an illustrative example of tracking a real-world object with respect to a virtual reality environment, in accordance with some embodiments of this disclosure. In some embodiments, a system (e.g., the system as described in connection with FIG. 1) generates for display a VR environment (e.g., VR environment 300) via a VR device (e.g., HMD 104 as described in connection with FIG. 1). In some implementations, VR environment 300 is generated for display by a third-party application, a third-party system, any other suitable VR provider, or any combination thereof. A VR user (e.g., VR user 102 as described in connection with FIG. 1) may wear HMD 104 to see VR environment 300. HMD 104 may run a VR application such as a virtual workplace or a VR game. VR environment 300 may comprise a room scale VR environment, a seated VR environment, or a standing VR environment. For example, the system runs a game application via HMD 104 in a standing VR environment (e.g., VR environment 300).

In some embodiments, the system receives an indication, from VR user 102, of a real-world object to be tracked (e.g., a smartphone). The system may receive the indication via a voice command, a gesture while holding the smartphone, a user interface interaction via a user interface of HMD 104 and/or of the smartphone, any other suitable user input, or any combination thereof. After the system receives the indication, VR user 102 may place the smartphone outside of VR environment 300 (e.g., the play area of VR user 102). The system may interpret the indication as a command to continue to track the location of the smartphone with respect to the movement of VR user 102. For example, the system may track the movement of VR user 102 via a camera of HMD 104, a gyroscope of HMD 104, a gyroscope of a corresponding device (e.g., a remote controller used by VR user 102 within VR environment 300, as indicated by virtual saber 302), any other suitable motion-tracking technique, or any combination thereof.

In some implementations, the system generates for display a virtual representation of the smartphone (e.g., virtual smartphone 304). The system may display virtual smartphone 304 in VR user's view of VR environment 300. In some embodiments, the location within VR user's view of VR environment 300 where the system displays virtual smartphone 304 indicates the direction in which VR user 102 may move to retrieve the real smartphone. For example, when VR user 102 wants to reach for the real smartphone, VR user 102 may determine that the real smartphone is to their left since the system displays virtual smartphone 304 on the left side of VR user's view of VR environment 300. As VR user 102 moves in the identified direction and crosses the play area (guardian) boundary, the system may transition HMD 104 to passthrough, allowing VR user 102 to retrieve the object.

Figure 4:
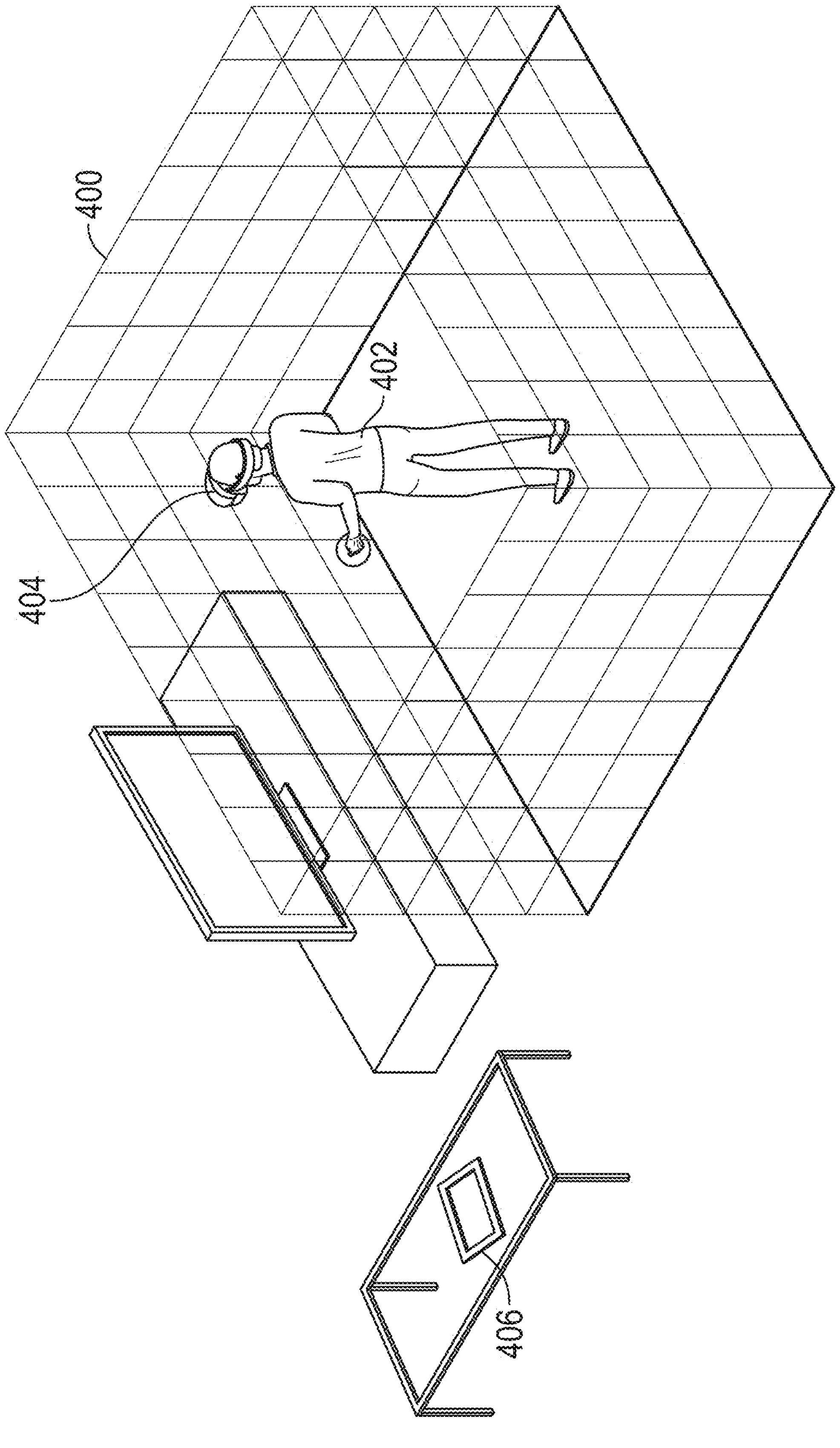
FIG. 4 depicts an illustrative example of tracking a real-world object with respect to a virtual reality environment, in accordance with some embodiments of this disclosure.

FIG. 4 shows an illustrative example of tracking a real-world object with respect to a virtual reality environment, in accordance with some embodiments of this disclosure. In some embodiments, a system (e.g., the system as described in connection with FIG. 1) generates for display a VR environment (e.g., VR environment 300 as described in connection with FIG. 3) via a VR device (e.g., HMD 404). In some implementations, VR environment 300 is generated for display by a third-party application, a third-party system, any other suitable VR provider, or any combination thereof. A VR user (e.g., VR user 402) may wear HMD 404 to see VR environment 300. HMD 404 may run a VR application such as a virtual workplace or a VR game. VR environment 300 may comprise a room scale VR environment, a seated VR environment, or a standing VR environment. For example, the system runs a game application via HMD 404 in a standing VR environment (e.g., VR environment 300).

In some embodiments, the system receives an indication, from VR user 402, of a real-world object to be tracked (e.g., real smartphone 406). The system may receive the indication via a voice command, a gesture while holding real smartphone 406, a user interface interaction via a user interface of HMD 104 and/or of real smartphone 406, any other suitable user input, or any combination thereof. After the system receives the indication, VR user 102 may place real smartphone 406 outside of VR environment 300 (e.g., play area 400). The system may interpret the indication as a command to continue to track the location real smartphone 406 with respect to the movement of VR user 402. For example, the system may track the movement of VR user 402 via a camera of HMD 404, a gyroscope of HMD 404, a gyroscope of a corresponding device (e.g., a remote controller used by VR user 402 within VR environment 300, as indicated by virtual saber 302), any other suitable motion-tracking technique, or any combination thereof.

In some embodiments, the system indicates the direction in which VR user 402 may move within play area 400 to retrieve real smartphone 406 by generating for display a virtual representation of real smartphone 406 within VR environment 300. For example, when VR user 402 wants to reach for the real smartphone, VR user 402 may determine that the real smartphone is to their left since the system displays the virtual representation of real smartphone 406 on the left side of VR user 402's view of VR environment 300. As VR user 402 moves in the identified direction and crosses the play area (guardian) boundary, the system may transition HMD 104 to passthrough, allowing VR user 402 to retrieve the object.

Figure 5:
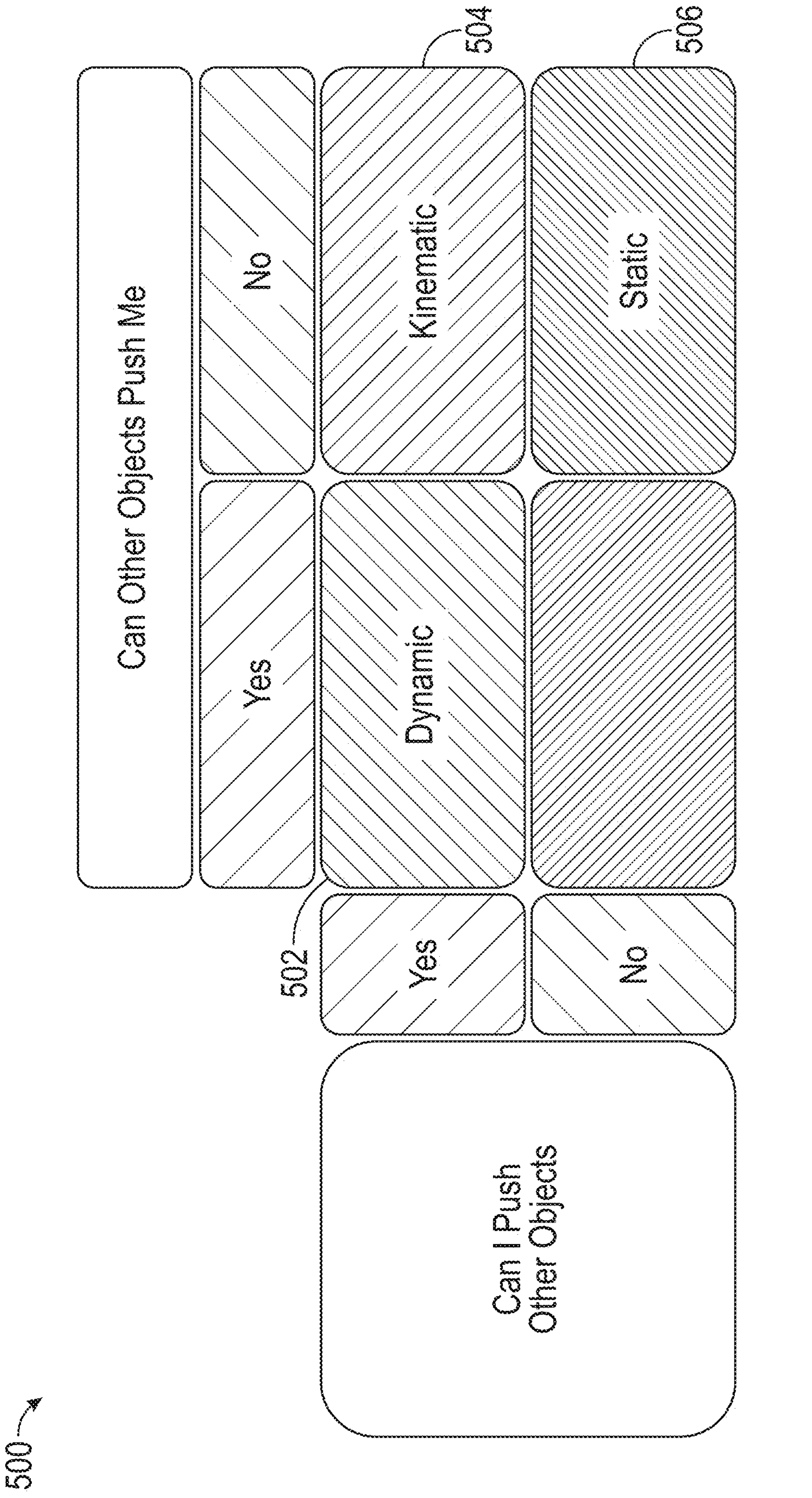
FIG. 5 depicts an illustrative diagram of attributes of dynamic, kinematic, and static objects, in accordance with some embodiments of this disclosure.

FIG. 5 shows an illustrative diagram of attributes of dynamic, kinematic, and static objects, in accordance with some embodiments of this disclosure. In some embodiments, a system (e.g., the system as described in connection with FIG. 1) generates for display a VR environment (e.g., VR environment 122 as described in connection with FIG. 1) via a VR device (e.g., HMD 104 as described in connection with FIG. 1). The system may use attributes of diagram 500 when determining how to modify a virtual reality environment by displacing a virtual object via an animation. In some implementations, VR environment 122 is generated for display by a third-party application, a third-party system, any other suitable VR provider, or any combination thereof. A VR user (e.g., VR user 102 as described in connection with FIG. 1) may wear HMD 104 to see VR environment 122. HMD 104 may run a VR application such as a virtual workplace or a VR game.

Virtual objects in virtual environments (e.g., virtual phone 114 within VR environment 122 as described in connection with FIG. 1) may be dynamic 502, kinematic 504, or static 506. In some embodiments, the system allows dynamic 502 virtual objects to be separated from their original respective virtual positions within the VR environment by VR users to new positions. The system may also allow dynamic 502 virtual objects to move other virtual objects within the VR environment. For example, the system may allow a VR user to interact with a virtual car kinematically, as generally cars can be moved by people (e.g., via driving) and can move people/objects (e.g., a car can move a fire hydrant by running into it). In some implementations, the system allows kinematic 504 virtual objects to be separated from their original respective virtual positions within the VR environment by VR users and moved to new positions. For example, a virtual book on a virtual table may be picked up by a VR user, as a book generally can be pushed by people/objects but cannot itself push people/objects. In some embodiments, the system may not allow VR users to interact with static 506 virtual objects. For example, a system may not allow a VR user to interact with and/or modify a virtual wall of a room, as a wall generally cannot be pushed by people/objects and generally does not push people/objects itself. In some embodiments, a designer of a VR experience may want VR users to be able to pick up and throw a virtual paper airplane but not move a virtual computer monitor that is critical to the VR experience. Additionally, a room full of interactable virtual objects generally requires more computing power than a room of static virtual objects (e.g., because checking for collisions or interactions with static objects uses computing power). Such aspects allow the system to avoid breaking immersion.

In some embodiments, virtual objects in virtual environments contain pre-canned animations that can be activated as needed. The pre-canned animations may be generated by the system, a third-party server, a third-party application, any other suitable animation generator, or any combination thereof. For example, the system may activate an animation of a virtual glass bottle shattering based on receiving an indication that the virtual glass bottle was struck by a VR user. In another example, the system may activate an animation of a virtual bird flying away based on receiving an indication that the virtual bird was startled by a VR user.

Figure 6:
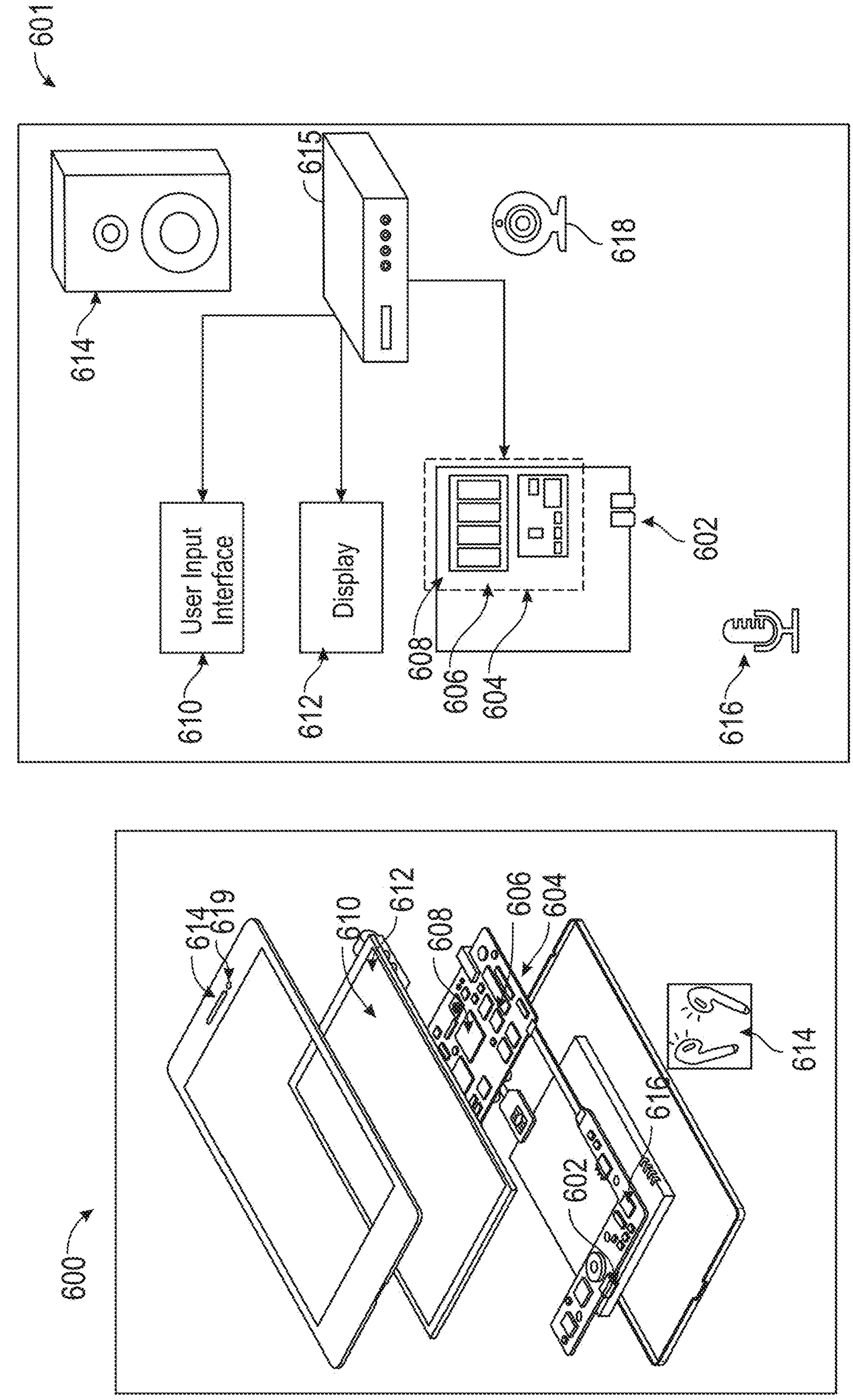
FIG. 6 depicts an illustrative user equipment device, in accordance with some embodiments of this disclosure.
Figure 7:
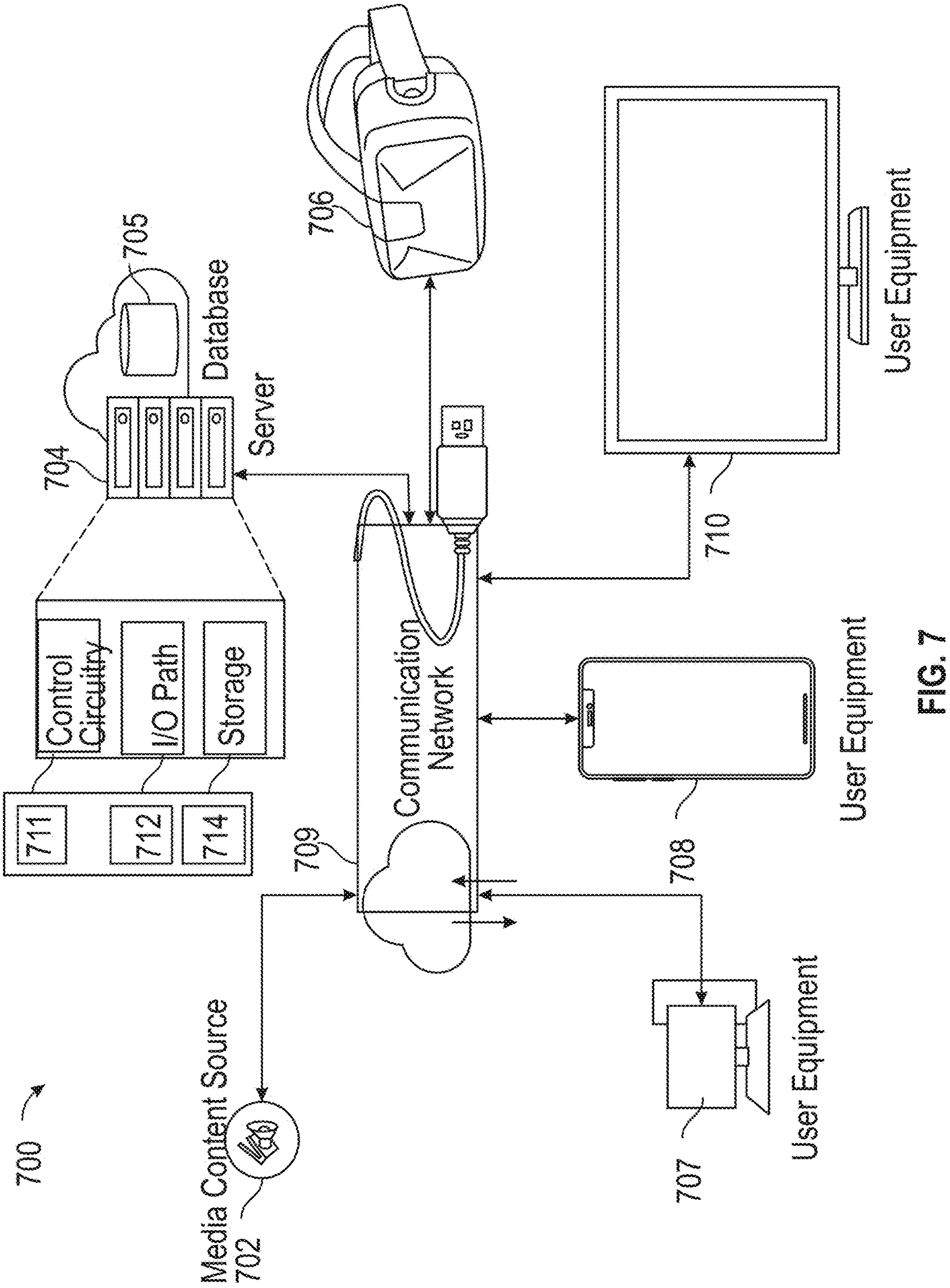
FIG. 7 depicts an illustrative user equipment device, in accordance with some embodiments of this disclosure.

FIGS. 6-7 describe illustrative devices, systems, servers, and related hardware for modifying a virtual reality environment to help prevent a collision with a real-world object, in accordance with some embodiments of the present disclosure. FIG. 6 shows generalized embodiments of illustrative user equipment 600 and 601, which may correspond to, e.g., HMD 104 of FIG. 1. For example, user equipment 600 may be a smartphone device, a tablet, a near-eye display device, an XR device, or any other suitable device capable of participating in a XR environment, e.g., locally or over a communication network. In another example, user equipment 601 may be a user television equipment system or device. User equipment 601 may include set-top box 615. Set-top box 615 may be communicatively connected to microphone 616, audio output equipment 614 (e.g., speaker or headphones), and display 612. In some embodiments, microphone 616 may receive audio corresponding to a voice of a user and/or ambient audio data. In some embodiments, display 612 may be a television display or a computer display. In some embodiments, set-top box 615 may be communicatively connected to user input interface 610. In some embodiments, user input interface 610 may be a remote-control device. Set-top box 615 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment are discussed below in connection with FIG. 7. In some embodiments, user equipment 600 may comprise any suitable number of sensors (e.g., gyroscope or gyrometer, or accelerometer, etc.), and/or a GPS module (e.g., in communication with one or more servers and/or cell towers and/or satellites) to ascertain a location of user equipment 600. In some embodiments, user equipment 600 comprises a rechargeable battery that is configured to provide power to the components of the device.

Each one of user equipment 600 and user equipment 601 may receive content and data via input/output (I/O) path 602. I/O path 602 may provide content (e.g., broadcast programming, on-demand programming, internet content, content available over a local area network (LAN) or wide area network (WAN), and/or other content) and data to control circuitry 604, which may comprise processing circuitry 606 and storage 608. Control circuitry 604 may be used to send and receive commands, requests, and other suitable data using I/O path 602, which may comprise I/O circuitry. I/O path 602 may connect control circuitry 604 to one or more communications paths (described below). I/O functions may be provided by one or more of these communications paths but are shown as a single path in FIG. 6 to avoid overcomplicating the drawing. While set-top box 615 is shown in FIG. 6 for illustration, any suitable computing device having processing circuitry, control circuitry, and storage may be used in accordance with the present disclosure. For example, set-top box 615 may be replaced by, or complemented by, a personal computer (e.g., a notebook, a laptop, a desktop), a smartphone (e.g., user equipment 600), an XR device, a tablet, a network-based server hosting a user-accessible client device, a non-user-owned device, any other suitable device, or any combination thereof.

Control circuitry 604 may be based on any suitable control circuitry such as processing circuitry 606. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 604 executes instructions for the system (as described in connection with FIGS. 1-3) stored in memory (e.g., storage 608). Specifically, control circuitry 604 may be instructed by the system to perform the functions discussed above and below. In some implementations, processing or actions performed by control circuitry 604 may be based on instructions received from the system.

In client/server-based embodiments, control circuitry 604 may include communications circuitry suitable for communicating with a server or other networks or servers. The system may be a stand-alone application implemented on a device or a server. The application may be implemented as software or a set of executable instructions. The instructions for performing any of the embodiments discussed herein of the application may be encoded on non-transitory computer-readable media (e.g., a hard drive, random-access memory on a DRAM integrated circuit, read-only memory on a BLU-RAY disk, etc.). For example, in FIG. 6, the instructions may be stored in storage 608, and executed by control circuitry 604 of a user equipment 600.

In some embodiments, the application may be a client/server application where only the client application resides on user equipment 600, and a server application resides on an external server (e.g., server 704 and/or media content source 702). For example, the application may be implemented partially as a client application on control circuitry 604 of user equipment 600 and partially on server 704 as a server application running on control circuitry 711. Server 704 may be a part of a local area network with one or more of user equipment 600, 601 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 704 and/or an edge computing device), referred to as "the cloud." User equipment 600 may be a cloud client that relies on the cloud computing capabilities from server 704 to generate personalized engagement options in a VR environment.

Control circuitry 604 may include communications circuitry suitable for communicating with a server, edge computing systems and devices, a table or database server, or other networks or servers. The instructions for carrying out the above-mentioned functionality may be stored on a server (which is described in more detail in connection with FIG. 7). Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the internet or any other suitable communication networks or paths (which is described in more detail in connection with FIG. 7). In addition, communications circuitry may include circuitry that enables peer-to-peer communication of user equipment, or communication of user equipment in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Storage 608 may be used to store various types of content described herein as well as application data described above. Nonvolatile memory may also be used (e.g., to launch a boot-up routine and other instructions). Cloud-based storage, described in relation to FIG. 6, may be used to supplement storage 608 or instead of storage 608. Non-transitory memory may store instructions that, when executed by control circuitry, I/O circuitry, any other suitable circuitry or combination thereof, executes functions of an application as described above.

Control circuitry 604 may include video generating circuitry and tuning circuitry, such as one or more analog tuners, one or more MPEG-2 decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 604 may also include scaler circuitry for upconverting and downconverting content into the preferred output format of user equipment 600. Control circuitry 604 may also include digital-to-analog converter circuitry and analog-to-digital converter circuitry for converting between digital and analog signals. The tuning and encoding circuitry may be used by user equipment 600, 601 to receive and to display, to play, or to record content. The tuning and encoding circuitry may also be used to receive video communication session data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

Control circuitry 604 may receive instruction from a user by way of user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of each one of user equipment 600 and user equipment 601. For example, display 612 may be a touchscreen or touch-sensitive display. In such circumstances, user input interface 610 may be integrated with or combined with display 612. In some embodiments, user input interface 610 includes a remote-control device having one or more microphones, buttons, keypads, any other components configured to receive user input or combinations thereof. For example, user input interface 610 may include a handheld remote-control device having an alphanumeric keypad and option buttons. In a further example, user input interface 610 may include a handheld remote-control device having a microphone and control circuitry configured to receive and identify voice commands and transmit information to set-top box 615.

Audio output equipment 614 may be integrated with or combined with display 612. Display 612 may be one or more of a monitor, television, liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Audio output equipment 614 may be provided as integrated with other elements of each one of user equipment 600 and user equipment 601 or may be stand-alone units. An audio component of videos and other content displayed on display 612 may be played through speakers (or headphones) of audio output equipment 614. In some embodiments, audio may be distributed to a receiver (not shown), which processes and outputs the audio via speakers of audio output equipment 614. In some embodiments, for example, control circuitry 604 is configured to provide audio cues to a user, or other audio feedback to a user, using speakers of audio output equipment 614. There may be a separate microphone 616 or audio output equipment 614 may include a microphone configured to receive audio input such as voice commands or speech. For example, a user may speak letters or words that are received by the microphone and converted to text by control circuitry 604. In a further example, a user may voice commands that are received by a microphone and recognized by control circuitry 604. Camera 618 may be any suitable video camera integrated with the equipment or externally connected. Camera 618 may be a digital camera comprising a charge-coupled device (CCD) and/or a complementary metal-oxide semiconductor (CMOS) image sensor. Camera 618 may be an analog camera that converts to digital images via a video card.

The application may be implemented using any suitable architecture. For example, it may be a stand-alone application wholly implemented on each one of user equipment 600 and user equipment 601. In such an approach, instructions of the application may be stored locally (e.g., in storage 608), and data for use by the application is downloaded on a periodic basis (e.g., from an out-of-band feed, from an internet resource, or using another suitable approach). Control circuitry 604 may retrieve instructions of the application from storage 608 and process the instructions to provide video conferencing functionality and generate any of the displays discussed herein. Based on the processed instructions, control circuitry 604 may determine what action to perform when input is received from user input interface 610. For example, movement of a cursor on a display up/down may be indicated by the processed instructions when user input interface 610 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, random access memory (RAM), etc.

Control circuitry 604 may allow a user to provide user profile information or may automatically compile user profile information. For example, control circuitry 604 may access and monitor network data, video data, audio data, processing data, content consumption data, and/or any other suitable data being accessed by a first user (e.g., first user 100 of HMD 102). Control circuitry 604 may obtain all or part of other user profiles that are related to a particular user (e.g., via social media networks), and/or obtain information about the user from other sources that control circuitry 604 may access. As a result, a user can be provided with a unified experience across the user's different devices.

In some embodiments, the application is a client/server-based application. Data for use by a thick or thin client implemented on each one of user equipment 600 and user equipment 601 may be retrieved on demand by issuing requests to a server remote to each one of user equipment 600 and user equipment 601. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on user equipment 600. This way, the processing of the instructions is performed remotely by the server while the resulting displays (e.g., that may include text, a keyboard, or other visuals) are provided locally on user equipment 600. User equipment 600 may receive inputs from the user via user input interface 610 and transmit those inputs to the remote server for processing and generating the corresponding displays. For example, user equipment 600 may transmit a communication to the remote server indicating that an up/down button was selected via user input interface 610. The remote server may process instructions in accordance with that input and generate a display of the application corresponding to the input (e.g., a display that moves a cursor up/down). The generated display is then transmitted to user equipment 600 for presentation to the user.

In some embodiments, the application may be downloaded and interpreted or otherwise run by an interpreter or virtual machine (run by control circuitry 604). In some embodiments, the application may be encoded in the ETV Binary Interchange Format (EBIF), received by control circuitry 604 as part of a suitable feed, and interpreted by a user agent running on control circuitry 604. For example, the application may be an EBIF application. In some embodiments, the application may be defined by a series of JAVA-based files that are received and run by a local virtual machine or other suitable middleware executed by control circuitry 604. In some of such embodiments (e.g., those employing MPEG-2, MPEG-4, HEVC or any other suitable digital media encoding schemes), the application may be, for example, encoded and transmitted in an MPEG-2 object carousel with the MPEG audio and video packets of a program.

As shown in FIG. 7, user equipment 706, 707, 708, 710 (which may correspond to user equipment, e.g., HMD 102 of FIG. 1A) may be coupled to communication network 709. Communication network 709 may be one or more networks including the internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 709) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 7 to avoid overcomplicating the drawing.

Although communications paths are not drawn between user equipment, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment may also communicate with each other directly through an indirect path via communication network 709.

System 700 may comprise media content source 702, one or more servers 704, and/or one or more edge computing devices. In some embodiments, the application may be executed at one or more of control circuitry 711 of server 704 (and/or control circuitry of user equipment 706, 707, 708, 710 and/or control circuitry of one or more edge computing devices). In some embodiments, the media content source and/or server 704 may be configured to host or otherwise facilitate video communication sessions between user equipment 706, 707, 708, 710 and/or any other suitable user equipment, and/or host or otherwise be in communication (e.g., over communication network 709) with one or more social network services.

In some embodiments, server 704 may include control circuitry 711 and storage 714 (e.g., RAM, ROM, Hard Disk, Removable Disk, etc.). Storage 714 may store one or more databases. Server 704 may also include an I/O path 712. In some embodiments, I/O path 712 is an I/O circuitry. I/O circuitry may be a NIC card, audio output device, mouse, keyboard card, any other suitable I/O circuitry device or combination thereof. I/O path 712 may provide video conferencing data, device information, or other data, over a local area network (LAN) or wide area network (WAN), and/or other content and data to control circuitry 711, which may include processing circuitry, and storage 714. Control circuitry 711 may be used to send and receive commands, requests, and other suitable data using I/O path 712, which may comprise I/O circuitry. I/O path 712 may connect control circuitry 711 to one or more communications paths.

Control circuitry 711 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 711 may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 711 executes instructions for an emulation system application stored in memory (e.g., the storage 714). Memory may be an electronic storage device provided as storage 714 that is part of control circuitry 711. Memory may store instruction to run the application.

Figure 8:
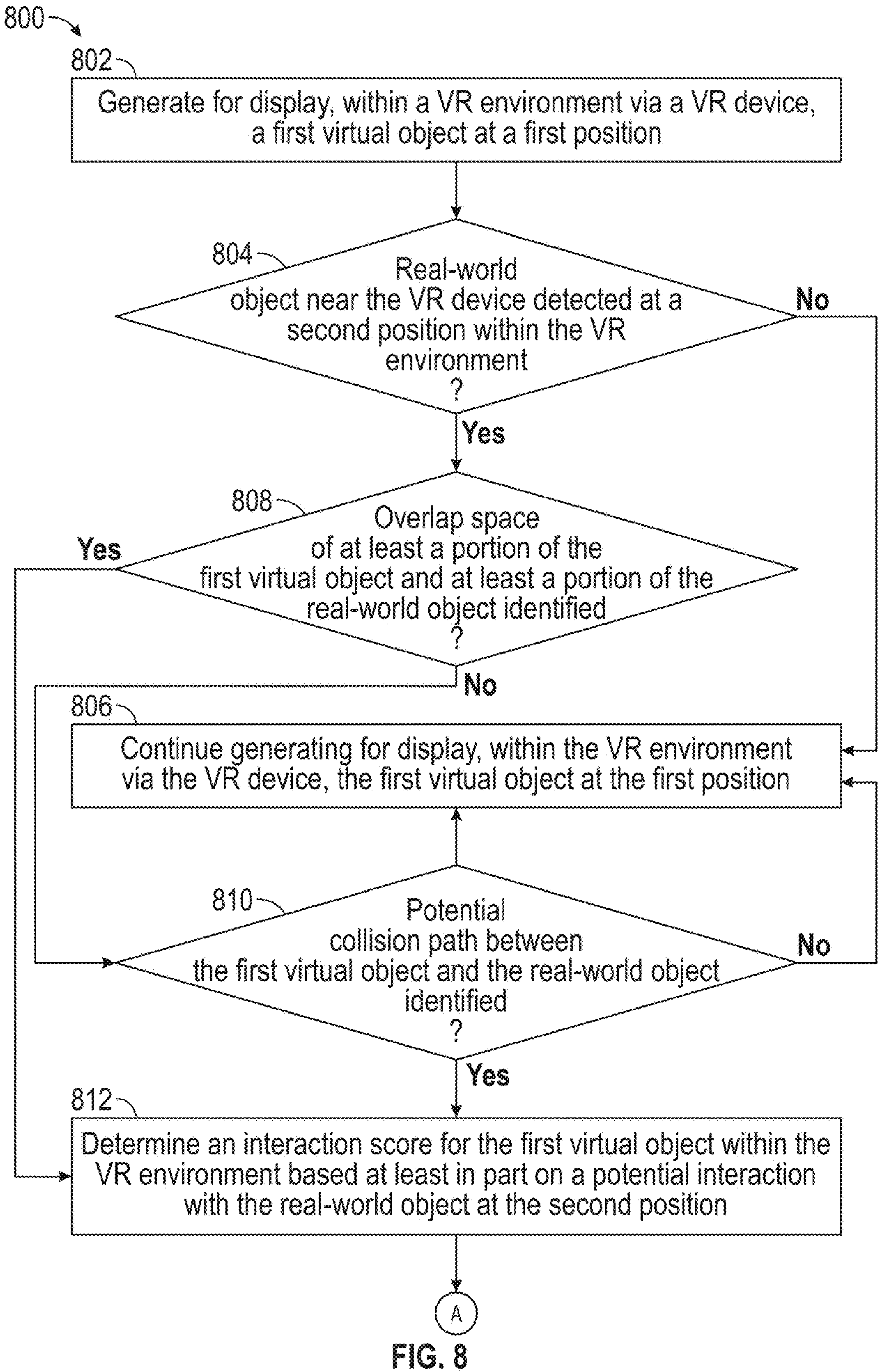
FIG. 8 depicts a flowchart of an illustrative process for modifying a virtual reality environment to prevent a collision with a real-world object, in accordance with some embodiments of this disclosure.
Figure 8:
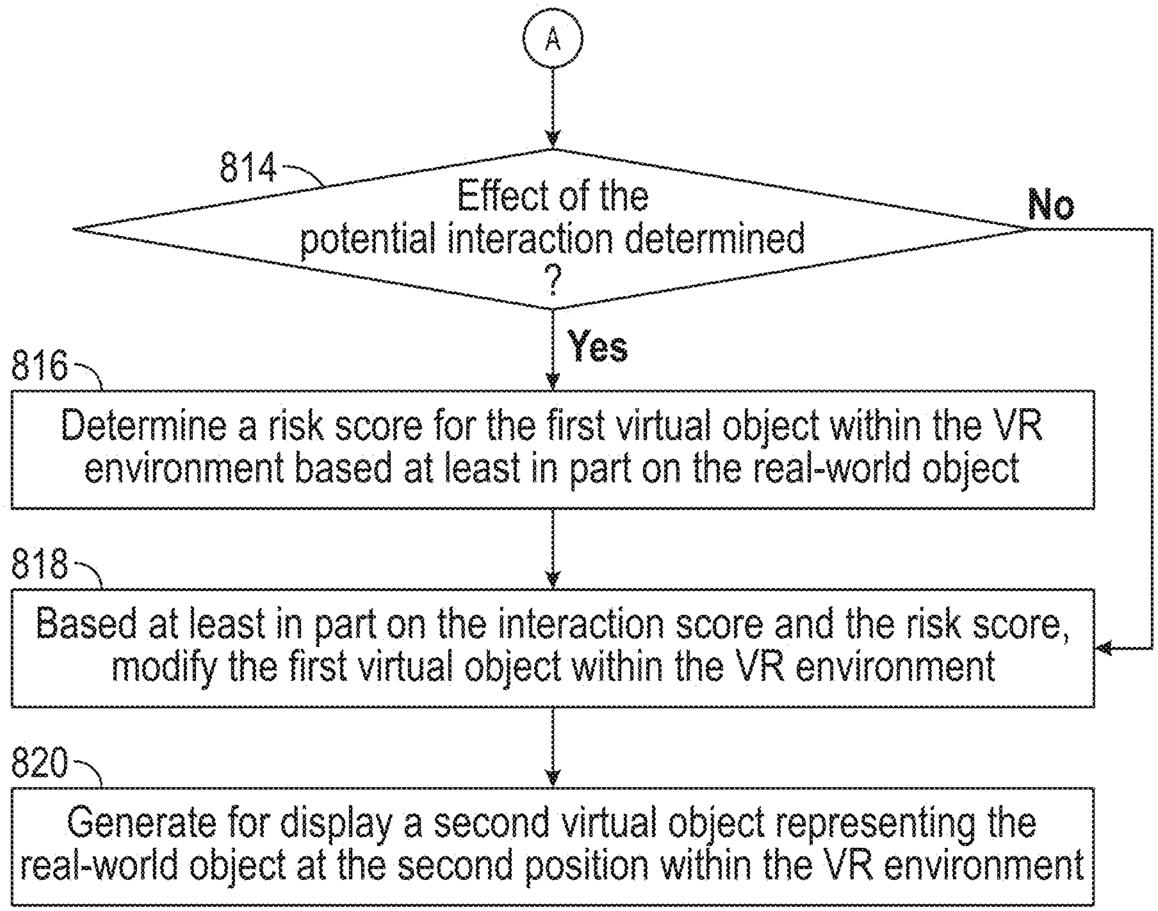

FIG. 8 is a flowchart of a detailed illustrative process 800 for modifying a virtual reality environment to help prevent a collision with a real-world object, in accordance with some embodiments of this disclosure. In various embodiments, the individual steps of process 800 may be implemented by one or more components of the devices, methods, and systems of FIG. 1 and FIGS. 6-7, and may be performed in combination with any of the other processes and aspects described herein. Although the present disclosure may describe certain steps of process 800 (and of other processes described herein) as being implemented by certain components of the devices, methods, and systems of FIG. 1 and FIGS. 6-7, this is for purposes of illustration only, and it should be understood that other components of the devices, methods, and systems of FIGS. 2-5 and FIGS. 9-10 may implement those steps instead.

In some embodiments, at step 802, control circuitry (e.g., control circuitry 604 of user equipment device 600 and/or control circuitry 711 of server 704) generates for display, within a VR environment via a VR device (e.g., VR environment 122 via HMD 104 as described in connection with FIG. 1), a first virtual object at a first position (e.g., virtual phone 114 at first position 126 as described in connection with FIG. 1). For example, control circuitry generates for display, via HMD 104, virtual phone 114 at first position 126 at a virtual desk within a virtual workplace environment. In some implementations, at step 804, control circuitry determines whether a real-world object (e.g., real coffee cup 106 as described in connection with FIG. 1) near the VR device is detected within the VR environment. In some implementations, the location of the real-world object corresponds to a second position within VR environment 122. For example, real coffee cup 106 is located in a "real" position that corresponds to the lower left portion of the virtual desk (e.g., a position near the location of virtual coffee cup 130). Control circuitry may detect the real-world object in various ways, such as localization of the object's image within an image captured by a camera of HMD 104, video object tracking, artificial intelligence (AI) image recognition, any suitable object detection technique or combination thereof.

If control circuitry does not detect a real-world object near the VR device at step 804, control circuitry may proceed to step 806 and continue to generate for display, within the VR environment via the VR device, the first virtual object at the first position. For example, if control circuitry does not detect any real objects near HMD 104, control circuitry continues to display virtual phone 114 at first position 126. If control circuitry detects a real-world object near the VR device at step 804, control circuitry may proceed to step 808. In some embodiments, at step 808, control circuitry determines whether an overlap space of at least a portion of the first virtual object and at least a portion of the real-world object is identified. For example, control circuitry may identify that the front of virtual phone 114 overlaps with a portion of the back of real coffee cup 106. If control circuitry 604 does not identify an overlap space, control circuitry may proceed to step 810. At step 810, in some embodiments, control circuitry determines whether a predicted interaction path between the first virtual object and the real-world object has been identified. For example, virtual phone 114 may be displayed in the left upper corner of the virtual desk of VR environment 122, and real coffee cup 106 may be in a position corresponding to the right upper corner of the virtual desk of VR environment 122. Control circuitry may determine, based on a third virtual object near virtual phone 114 and real coffee cup 106 and/or based on movement patterns of VR user 102, that there is a predicted interaction path between virtual phone 114 and real coffee cup 106.

If, at step 810, control circuitry does not identify a predicted interaction path between the first virtual object and the real-world object, control circuitry may revert to step 806 and continue generating for display the first virtual object at the first position. If control circuitry identifies a predicted interaction path between the first virtual object and the real-world object at step 810, and/or if control circuitry identifies an overlap space at step 808, control circuitry may proceed to step 812. At step 812, in some implementations, control circuitry determines an interaction score for the first virtual object within the VR environment based at least in part on a potential interaction with the real-world object at the second position. Control circuitry may determine the interaction score for virtual phone 114 using any of the techniques as described in connection with FIG. 1, for instance.

In some embodiments, after determining an interaction score for the first virtual object, control circuitry proceeds to step 814 to determine whether an effect of the potential interaction with the real-world object has been determined. For example, control circuitry may determine that hand 124 of VR user 102 colliding with real coffee cup 106 while it is full of hot coffee may result in hot coffee spilling on VR user 102 and/or elsewhere in real-world environment 100, as described in connection with FIG. 1. This potential interaction could result in VR user 102 getting burned and/or real-world objects getting ruined. If control circuitry determines an effect of the potential interaction, control circuitry may proceed to step 816. If control circuitry does not determine an effect of the potential interaction (e.g., if control circuitry is not able to determine a risk score), control circuitry may proceed to step 818.

At step 816, in some implementations, control circuitry 816 determines a risk score for the first virtual object within the VR environment based at least in part on the real-world object. For example, based on the effect of the potential interaction between VR user 102 and real coffee cup 106 determined at step 814, control circuitry may determine that virtual phone 114 has a high risk score. Control circuitry may determine the risk score of the first virtual object using any of the techniques described in connection with FIG. 1, for example. In some embodiments, at step 818, based at least in part on the interaction score and the risk score, control circuitry 604 modifies the first virtual object within the VR environment. For example, as described in connection with FIG. 1, control circuitry may increase or decrease the size of virtual phone 114 to reduce the likelihood of VR user 102 colliding with real coffee cup 106 while reaching toward virtual phone 114. At step 820, in some implementations, control circuitry generates for display a second virtual object representing the real-world object at the second position within the VR environment. For example, control circuitry may generate for display, such as by a 3D mesh, virtual coffee cup 130 at the second position within VR environment 122. In another example, control circuitry generates for display a visual deterrent, such as a virtual cactus, to deter VR user 102 from moving their hand in the direction of real coffee cup 106.

Figure 9:
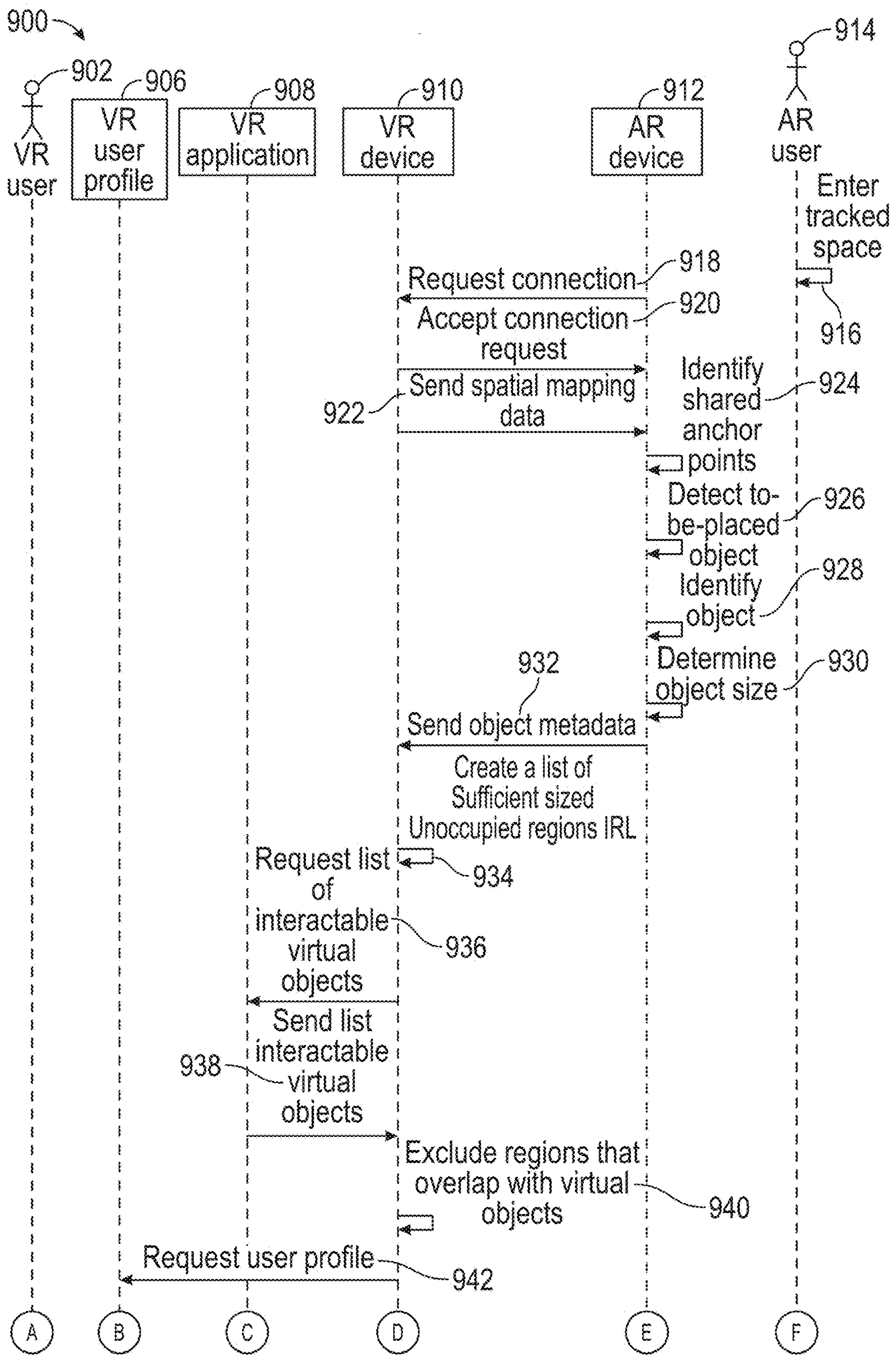
FIG. 9 depicts a sequence diagram for identifying a safe placement area for a real-world object, in accordance with some embodiments of this disclosure.
Figure 9:
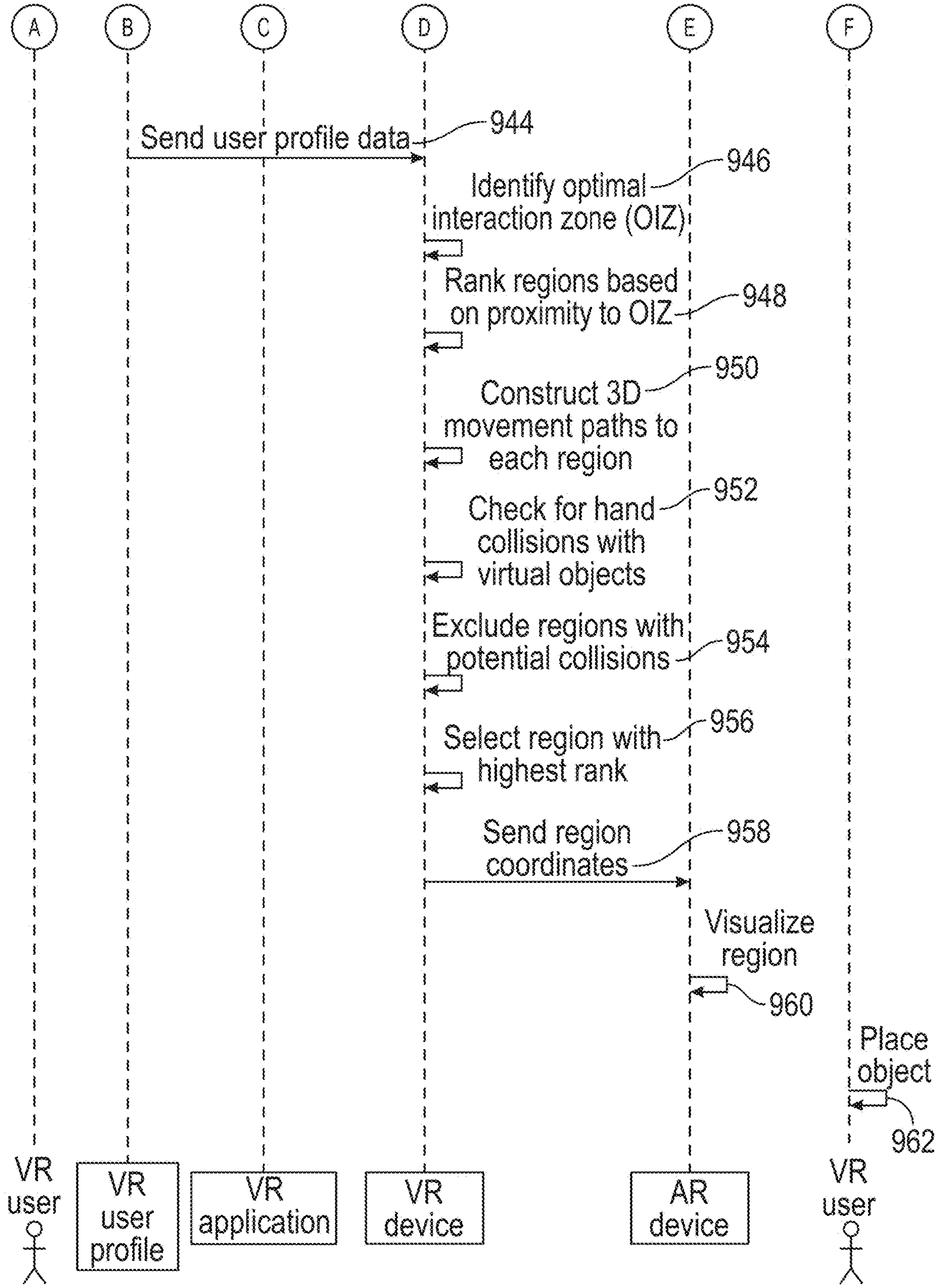

FIG. 9 is a sequence diagram for identifying a safe placement area for a real-world object in a vicinity of a user engaged in a virtual environment, in accordance with some embodiments of this disclosure. In various embodiments, the individual steps of process 900 may be implemented by one or more components of the devices, methods, and systems of FIG. 1 and FIGS. 6-7 and may be performed in combination with any of the other processes and aspects described herein. Although the present disclosure may describe certain steps of process 900 (and of other processes described herein) as being implemented by certain components of the devices, methods, and systems of FIG. 1 and FIGS. 6-7, this is for purposes of illustration only, and it should be understood that other components of the devices, methods, and systems of FIGS. 2-5, FIG. 8, and FIG. 10 may implement those steps instead.

Process 900 enables a real object to be placed by an augmented reality (AR) user (e.g., AR user 914) within a VR environment (e.g., VR environment 122, as described in connection with FIG. 1) in a way that does not compromise the immersion of the VR user (e.g., VR user 902) within the VR environment. At step 916, a system (e.g., the system as described in connection with FIG. 1) may detect that AR user 914 enters a region of a real-world environment that is tracked by a VR device (e.g., VR device 910). For example, VR user 902 is playing a VR game application (e.g., VR application 908) in a living room of a house that is tracked by sensors and cameras of VR device 910. The system may be implemented as a third-party application on AR device 912 and/or VR device 910, or may be native to AR device 912 and/or VR device 910. AR user 914 may walk into the living room, using AR device 912, while holding a real-world object (e.g., real coffee cup 106, as described in connection with FIG. 1). In some implementations, the tracked region of VR device 910 is determined by VR device 910, VR application 908, or VR user 902.

In some embodiments, at step 918, the system establishes a connection between AR device 912 and VR device 910. For example, AR device 912 may communicate directly or over a network with VR device 910 to indicate its presence, and/or a received signal strength indicator (RSSI) may be used to determine that AR device 912 has entered a tracked region of VR device 910, and/or GPS or other location data may be used. As another example, one or more images may be captured by AR device 912 or VR device 910 and analyzed to determine that AR device 912 has entered a tracked region of VR device 910, and/or any other suitable number of sensors may be used (e.g., an external camera, IOT devices, motion sensors, or any other suitable sensor, or any combination thereof). In some implementations, the system detects AR device 912 within a tracked region of VR device 910 by detecting an IP address and/or a MAC address of VR device 910 in the same network as AR device 912.

At step 920, in some embodiments, VR device 910 accepts the connection request from AR device 912 and, at step 922, sends spatial mapping data to AR device 912. For example, VR device 910 sends spatial data of the living room to AR device 912. In some implementations, at step 924, AR device 912 identifies shared anchor points (e.g., points of reference) in the real-world environment corresponding to VR environment 122. At step 926, the system may detect a real-world object (e.g., real coffee cup 106) that AR user 914 intends to set down in the real-world environment within the tracked region of VR environment 122. The system may detect real coffee cup 106 via a camera(s) and/or sensor(s) of AR device 912 and/or VR device 910. At step 928, the system may identify the real-world object to be placed by AR user 914 using, e.g., any suitable 3D segmentation method(s). The system may identify the real-world object with varying levels of specificity (e.g., beverage container vs. hot coffee). At step 930, in some embodiments, AR device 912 detects the size of real coffee cup 106 to be placed by, e.g., generating a bounding box around real coffee cup 106.

In some embodiments, at step 932, AR device 912 sends object metadata (e.g., identity, size) to VR device 910 which, at step 934, identifies sufficiently sized unoccupied regions IRL (in real life) (e.g., of the real-world environment within the tracked region of VR environment 122). For example, AR device 912 identifies a real-world desk within the tracked region of VR environment 122 with enough surface area for real coffee cup 106 to be placed upon it. In some implementations, AR device 912 may perform step 934. At step 936, in some embodiments, VR device 910 requests a list of interactable virtual objects from VR application 908, and at step 938, VR application 908 sends a list of interactable virtual objects to VR device 910. For example, a region with many virtual objects would not be a good region for AR user 914 to place real coffee cup 106 because VR user 902 may interact with a virtual object, and accidentally collide with real coffee cup 106 in the process. Thus, in some embodiments, at step 940, VR device 910 may exclude regions of the real-world environment that overlap with virtual objects within VR environment 122 to avoid collisions from VR user 902.

In some embodiments, at step 942, VR device 910 requests user profile data from VR user profile 906. At step 944, VR user profile 90 may send user profile data to VR device 910. VR device 910 may use the user profile data to predict the movements of VR user 902. The historical and contextual movement patterns of VR user 902 may be used by VR device 910 when identifying an optimal interaction zone (OIZ) at step 946. The OIZ is a region of the tracked region of VR environment that has the smallest likelihood (or a suitably small likelihood) of being interacted with by VR user 902. VR device 910, at step 948, ranks regions of the tracked region based on their proximity to the OIZ. VR device 910 then checks for potential collisions that may occur if real coffee cup 106 is placed in each virtual region. For example, a region of the real-world desk may be unoccupied by any real-world object, but that same region within VR environment 122 may be occupied by a virtual button. At step 950, VR device 910 may construct 3D movement paths to each region from VR device 910 and, at step 952, check for hand collisions with virtual objects along the 3D movement paths between VR user's default hand and/or VR controller positions and potential placement locations.

At step 954, VR device 910 may exclude regions with potential collisions. For example, the region that is occupied by a virtual button would be excluded as a potential placement location. The result is a list of regions within the tracked region that are unoccupied both in the real-world environment and in VR environment 122. With potential placement locations and user hand movement paths identified, the system selects, at step 956, the placement location with a relatively high or highest rank (generally, a location with a suitably low likelihood of resulting in a collision), optionally weighted by other factors such as proximity to optimal interaction distance.

At step 958, in some implementations, the system sends coordinates of the selected region from VR device 910 to AR device 912. At step 960, AR device 912 may visualize the selected region for AR user 914. For example, AR device 912 may cause for display a mapping of VR environment 122, within a viewport of AR device 912, indicating the selected region where AR user 914 should place real coffee cup 106. Upon AR user 914 placing the real-world object in the indicated region at step 962, AR device 912 may communicate to VR device 910 that the real-world object has been placed. While VR device 910 may receive placed object information and identify placement locations, a cloud service or a computer tethered to VR device 910 may perform those steps instead.

If VR device 910 is unable to find a viable location for the real-world object at step 956, VR device 910 may identify potentially viable locations that are occupied by dynamic virtual objects. If a suitable animation exists for displacing the dynamic virtual object (e.g., a stack of virtual books toppling over, a virtual sleeping cat waking up and moving to a different location), the system may activate the animation to create room for the real-world object. If no suitable animation exists, the system may modify the dynamic virtual object to create the virtual space necessary for the real-world object. Depending on context and the size of the real-world object, the modifications may include scaling, rotating, moving, any other suitable modifications, or any combination thereof. Depending on the level of interactivity of the real-world object, the system may prioritize locations that maintain a similar distance from the user, to preserve ease of interaction. In some embodiments, VR device 910 may delete an interactable object to create room for the real-world object (e.g., a user is less likely to collide with the real-world object when there is not a virtual object in the corresponding position as the real-world object).

Figure 10:
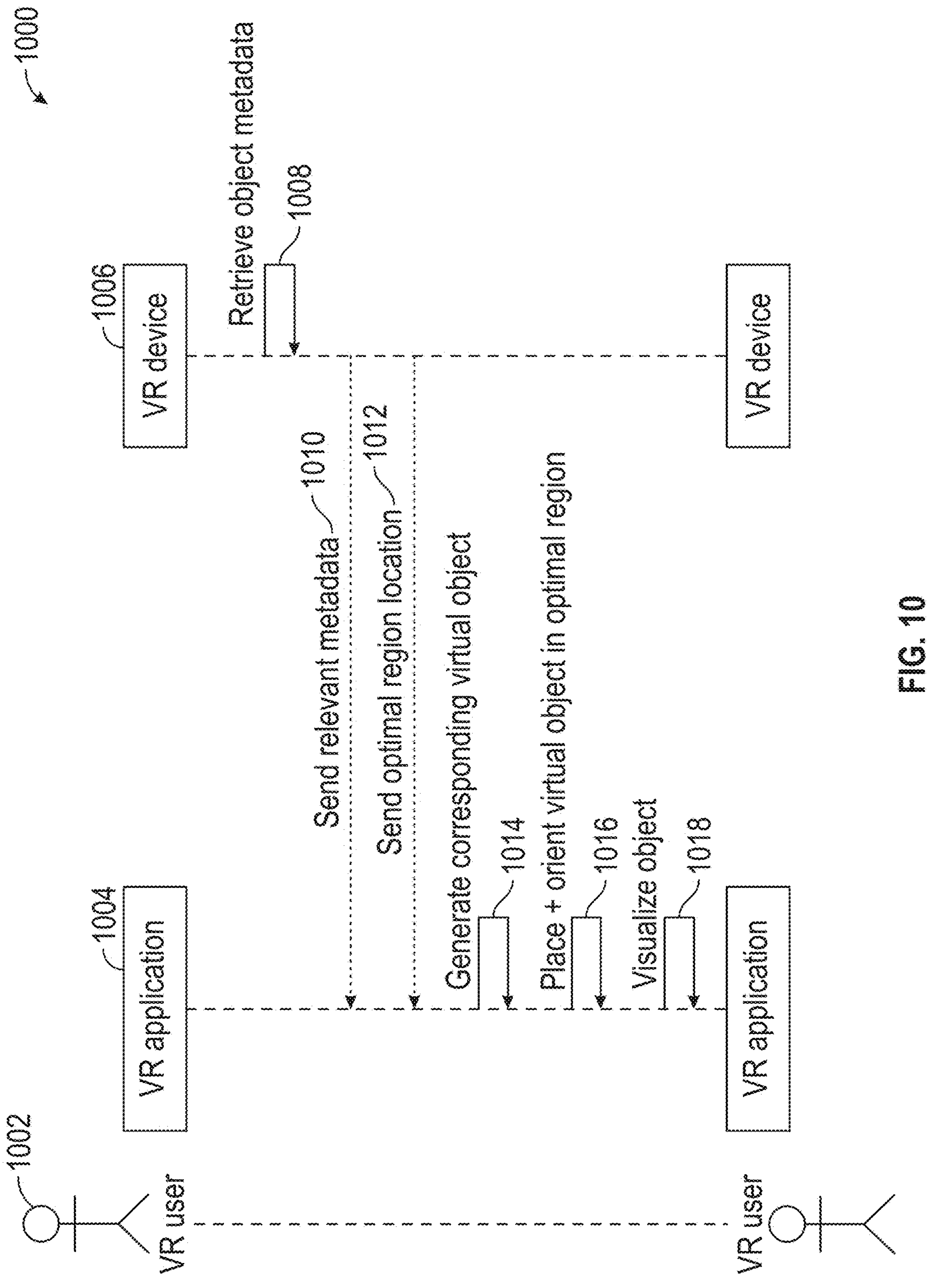
FIG. 10 depicts a sequence diagram for generating for display a virtual representation of a real-world object, in accordance with some embodiments of this disclosure.

FIG. 10 is a sequence diagram for generating for display a virtual representation of a real-world object. In various embodiments, the individual steps of process 1000 may be implemented by one or more components of the devices, methods, and systems of FIG. 1 and FIGS. 6-7 and may be performed in combination with any of the other processes and aspects described herein. Although the present disclosure may describe certain steps of process 1000 (and of other processes described herein) as being implemented by certain components of the devices, methods, and systems of FIG. 1 and FIGS. 6-7, this is for purposes of illustration only, and it should be understood that other components of the devices, methods, and systems of FIGS. 2-5 and FIGS. 8-9 may implement those steps instead.

At step 1008, a system (e.g., the system as described in connection with FIG. 1) retrieves object metadata at VR device 1006. For example, VR device 1006 runs VR application 1004 and is operated by VR user 1002. VR device 1006 may retrieve metadata of a real-world object (e.g., the size and shape of real coffee cup 106 as described in connection with FIG. 1) detected by the system after the real-world object has been placed within a VR environment (e.g., VR environment 122 as described in connection with FIG. 1) by a person (e.g., VR user 1002 or AR user 914 as described in connection with FIG. 9). The system may detect a real-world object using any of the techniques described in connection with FIG. 1. At step 1010, in some embodiments, VR device 1006 sends relevant metadata to VR application 1004. At step 1012, VR device 1006 may send an optimal region location to VR application 1004. The system may determine the optimal region location (or optimal interaction zone (OIZ)) using the techniques described in connection with FIG. 9.

In some embodiments, at step 1014, VR application 1004 may generate a corresponding virtual object. For example, if the system detects that real coffee cup 106 has been placed on a real desk, the system may generate a virtual coffee mug matching its proportions in the same location, oriented with the handle facing the same direction. In some implementations, at step 1016, the VR application may place and orient the corresponding virtual object in the optimal region location. For example, the virtual coffee cup may be placed in an OIZ to decrease the risk of VR user 1002 colliding with real coffee cup 106. At step 1018, VR application 1004 visualizes the corresponding virtual object. In some embodiments, VR device 1006 may place a virtual object that corresponds to the virtual environment by choosing a relevant 3D asset from the VR application. For example, in a medieval-themed game, VR application 1004 may use a virtual wine chalice to represent a similarly shaped real water bottle. Such virtual objects may be provided by the game developer or generated using AI techniques.

The processes discussed above are intended to be illustrative and not limiting. One skilled in the art would appreciate that the steps of the processes discussed herein may be omitted, modified, combined and/or rearranged, and any additional steps may be performed without departing from the scope of the disclosure. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods. Throughout the specification the phrases "in response to" and "based on" shall be understood to have a broad meaning unless context requires otherwise. For example, "in response to" can refer to a step that is in direct or indirect response to a prior step, and "based on" can refer to a step that is based at least in part on a prior step.

What is claimed is:

1. A method comprising:

generating for display, within a virtual reality (VR) environment via a VR device, a first virtual object at a first position;

detecting a real-world object near the VR device, the real-world object corresponding to a second position within the VR environment;

determining an interaction score for the first virtual object within the VR environment based at least in part on an amount of overlap space between the first virtual object and the real-world object at the second position;

determining a risk score for the first virtual object within the VR environment based at least in part on the real-world object;

based at least in part on the interaction score and the risk score, modifying the first virtual object within the VR environment; and generating for display a second virtual object representing the real-world object at the second position within the VR environment.

2. The method of claim 1, wherein the second virtual object representing the real-world object at the second position within the VR environment comprises a visual deterrent, and an intensity of the visual deterrent is based at least in part on the interaction score of the first virtual object or the risk score of the first virtual object.

3. The method of claim 1, wherein the risk score of the first virtual object is determined based at least in part on an effect of a potential interaction with the real-world object.

4. The method of claim 1, wherein determining the amount of overlap space between the first virtual object and the real-world object at the second position comprises identifying an overlap space of at least a portion of the first virtual object at the first position within the VR environment and at least a portion of the real-world object at the second position within the VR environment.

5. The method of claim 1, wherein the determining the interaction score for the first virtual object comprises:

identifying a predicted interaction path between the first virtual object and the real-world object;

detecting a third virtual object near the predicted interaction path; and determining a probability of interaction of the third virtual object within the predicted interaction path, wherein the interaction score is determined based at least in part on the probability of interaction of the third virtual object near the predicted interaction path.

6. The method of claim 1, further comprising:

updating the interaction score based at least in part on one or more of the following factors: time of day; contextual patterns; application type; recent activity; or historical patterns.

7. The method of claim 1, wherein the interaction score of the first virtual object is a first interaction score, wherein the modifying the first virtual object in the VR environment comprises:

identifying, within the VR environment, a third position that does not overlap with another virtual object within the VR environment nor with another real-world object near the VR device;

determining a second interaction score for the first virtual object within the VR environment based at least in part on a potential interaction with the real-world object at the third position; and based at least in part on the second interaction score, displacing the first virtual object from the first position to the third position via an animation, wherein the animation corresponds to a theme of the VR environment.

8. The method of claim 1, wherein the modifying the first virtual object within the VR environment comprises ceasing the generating for display the first virtual object at the first position.

9. The method of claim 1, wherein the modifying the first virtual object within the VR environment comprises changing an appearance of the first virtual object by at least one of scaling the first virtual object or rotating the first virtual object.

10. The method of claim 1, wherein the generating for display the second virtual object representing the real-world object at the second position within the VR environment comprises:

scanning the real-world object;

based on the scanning the real-world object, generating a three-dimensional (3D) representation of the real-world object corresponding to proportions of the real-world object; and providing for display, the 3D representation at the second position within the VR environment.

11. The method of claim 10, wherein the providing for display the 3D representation comprises providing for display the 3D representation via a diegetic placement or a saccadic masking.

12. The method of claim 1, wherein the second virtual object representing the real-world object at the second position within the VR environment is visually customized to a theme of the VR environment.

13. The method of claim 1, wherein the VR environment comprises a room scale VR environment, a seated VR environment, or a standing VR environment.

14. The method of claim 1, further comprising:

detecting a second real-world object near the VR device;

determining a preferred position within the VR environment for the second real-world object; and generating for display an indication of the preferred position within the VR environment.

15. The method of claim 14, wherein the indication of the preferred position within the VR environment is generated for display via an augmented reality (AR) device near the VR device.

16. A system comprising:

control circuitry configured to:

generate for display, within a virtual reality (VR) environment via a VR device, a first virtual object at a first position;

detect a real-world object near the VR device, the real-world object corresponding to a second position within the VR environment;

determine an interaction score for the first virtual object within the VR environment based at least in part on an amount of overlap space between the first virtual object and the real-world object at the second position;

determine a risk score for the first virtual object within the VR environment based at least in part on the real-world object;

based at least in part on the interaction score and the risk score, modify the first virtual object within the VR environment; and generate for display a second virtual object representing the real-world object at the second position within the VR environment.

17. The system of claim 16, wherein the second virtual object representing the real-world object at the second position within the VR environment comprises a visual deterrent, and an intensity of the visual deterrent is based at least in part on the interaction score of the first virtual object or the risk score of the first virtual object.

18. The system of claim 16, wherein the control circuitry is further configured to determine the risk score of the first virtual object based at least in part on an effect of a potential interaction with the real-world object.

19. The system of claim 16, wherein the control circuitry determines the amount of overlap space between the first virtual object and the real-world object at the second position by identifying an overlap space of at least a portion of the first virtual object at the first position within the VR environment and at least a portion of the real-world object at the second position within the VR environment.

20. The system of claim 16, wherein the control circuitry is configured to determine the interaction score for the first virtual object by:

identifying a predicted interaction path between the first virtual object and the real-world object;

detecting a third virtual object near the predicted interaction path; and determining a probability of interaction of the third virtual object within the predicted interaction path, wherein the interaction score is determined based at least in part on the probability of interaction of the third virtual object near the predicted interaction path.

* * * * *